United States Patent [19]
Suzuki

[11] Patent Number: 5,956,488
[45] Date of Patent: Sep. 21, 1999

[54] MULTIMEDIA SERVER WITH EFFICIENT MULTIMEDIA DATA ACCESS SCHEME

[75] Inventor: Masaki Suzuki, Kanagawa-ken, Japan

[73] Assignee: Kabushiki Kaisha Toshiba, Kawasaki, Japan

[21] Appl. No.: 08/616,807

[22] Filed: Mar. 15, 1996

[30] Foreign Application Priority Data

Mar. 16, 1995 [JP] Japan .................................... 7-083452

[51] Int. Cl.$^6$ .................................................. G06F 17/00
[52] U.S. Cl. ..................................................... 395/200.49
[58] Field of Search ........................ 395/200.49; 348/12; 711/112, 113, 114, 104

[56] References Cited

U.S. PATENT DOCUMENTS

| | | | |
|---|---|---|---|
| 5,553,005 | 9/1996 | Voeten et al. | 395/200.49 |
| 5,574,662 | 11/1996 | Windrem et al. | 395/200.49 |
| 5,610,841 | 3/1997 | Tanaka et al. | 395/200.49 |

OTHER PUBLICATIONS

Buck, "The Oracle Media Server for nCUBE Massively Parallel Systems", Proceedings of 8th International Parallel Processing Symposium, pp. 670–673, (1994).

*Primary Examiner*—Ellis B. Ramirez
*Attorney, Agent, or Firm*—Foley & Lardner

[57] ABSTRACT

A multimedia server capable of reducing a number of accesses to memory devices with low access speed. Whether a desired multimedia data requested by one terminal connected with one input/output unit is present in a buffer of another input/output unit is judged, and the desired multimedia data is transferred to a buffer of that one input/output unit, from the multimedia data storage device when the desired multimedia data is judged as not present, or from a buffer of that another input/output unit when the desired multimedia data is judged as present. It is also possible to predict future necessary multimedia data at each input/output unit, monitor the multimedia data transferred through the network, and pre-fetch the future necessary multimedia data from the monitored multimedia data. It is also possible to combine a plurality of requests for an identical multimedia data issued by different terminals connected with different input/output units within a prescribed period of time into a single unified request, so that the identical multimedia data can be obtained by the single access and transferred to the different input/output units simultaneously.

20 Claims, 21 Drawing Sheets

FIG. 11

| DATA NAME | STORED POSITION ON MULTIMEDIA DATA STORAGE DEVICE | BUFFER STORING DATA |
|---|---|---|
| | | |
| | | |
| | | |
| | | |
| | | |
| | | |

FIG. 12

| DATA NAME | STORED POSITION ON MULTIMEDIA DATA STORAGE DEVICE | BUFFER STORING DATA |
|---|---|---|
| DATA J | MULTIMEDIA DATA STORAGE DEVICE 1-X | NONE |
| DATA K | MULTIMEDIA DATA STORAGE DEVICE 1-X | NONE |
| DATA L | MULTIMEDIA DATA STORAGE DEVICE 1-Y | NONE |
| DATA M | MULTIMEDIA DATA STORAGE DEVICE 1-Y | NONE |
| | | |
| | | |

FIG. 13

| DATA NAME | STORED POSITION ON MULTIMEDIA DATA STORAGE DEVICE | BUFFER STORING DATA |
|---|---|---|
| DATA J | MULTIMEDIA DATA STORAGE DEVICE 1-X | BUFFER 22-A |
| DATA K | MULTIMEDIA DATA STORAGE DEVICE 1-X | NONE |
| DATA L | MULTIMEDIA DATA STORAGE DEVICE 1-Y | NONE |
| DATA M | MULTIMEDIA DATA STORAGE DEVICE 1-Y | NONE |
| | | |
| | | |

FIG. 14

| DATA NAME | STORED POSITION ON MULTIMEDIA DATA STORAGE DEVICE | BUFFER STORING DATA |
|---|---|---|
| DATA J | MULTIMEDIA DATA STORAGE DEVICE 1-X | BUFFER 22-A, BUFFER 22-B |
| DATA K | MULTIMEDIA DATA STORAGE DEVICE 1-X | NONE |
| DATA L | MULTIMEDIA DATA STORAGE DEVICE 1-Y | NONE |
| DATA M | MULTIMEDIA DATA STORAGE DEVICE 1-Y | NONE |
| | | |
| | | |

FIG. 15

| DATA NAME | STORED POSITION ON MULTIMEDIA DATA STORAGE DEVICE | BUFFER STORING DATA |
|---|---|---|
| DATA J | MULTIMEDIA DATA STORAGE DEVICE 1-X | BUFFER 22-B |
| DATA K | MULTIMEDIA DATA STORAGE DEVICE 1-X | BUFFER 22-A |
| DATA L | MULTIMEDIA DATA STORAGE DEVICE 1-Y | NONE |
| DATA M | MULTIMEDIA DATA STORAGE DEVICE 1-Y | NONE |
| | | |
| | | |

FIG. 17

| DATA NAME | STORED POSITION ON MULTIMEDIA DATA STORAGE DEVICE | BUFFER STORING DATA |
|---|---|---|
| DATA J | MULTIMEDIA DATA STORAGE DEVICE 1-X | BUFFER 22-B |
| DATA K | MULTIMEDIA DATA STORAGE DEVICE 1-X | BUFFER 22-A |
| DATA L | MULTIMEDIA DATA STORAGE DEVICE 1-Y | NONE |
| DATA M | MULTIMEDIA DATA STORAGE DEVICE 1-Y | NONE |
| ⋮ | ⋮ | ⋮ |
| DATA N | OTHER SERVER | NONE |

FIG. 18

| DATA NAME | STORED POSITION ON MULTIMEDIA DATA STORAGE DEVICE | BUFFER STORING DATA |
|---|---|---|
| DATA J | MULTIMEDIA DATA STORAGE DEVICE 1-X | BUFFER 22-B |
| DATA K | MULTIMEDIA DATA STORAGE DEVICE 1-X | NONE |
| DATA L | MULTIMEDIA DATA STORAGE DEVICE 1-Y | NONE |
| DATA M | MULTIMEDIA DATA STORAGE DEVICE 1-Y | NONE |
| ⋮ | ⋮ | ⋮ |
| DATA N | OTHER SERVER | BUFFER 22-A |

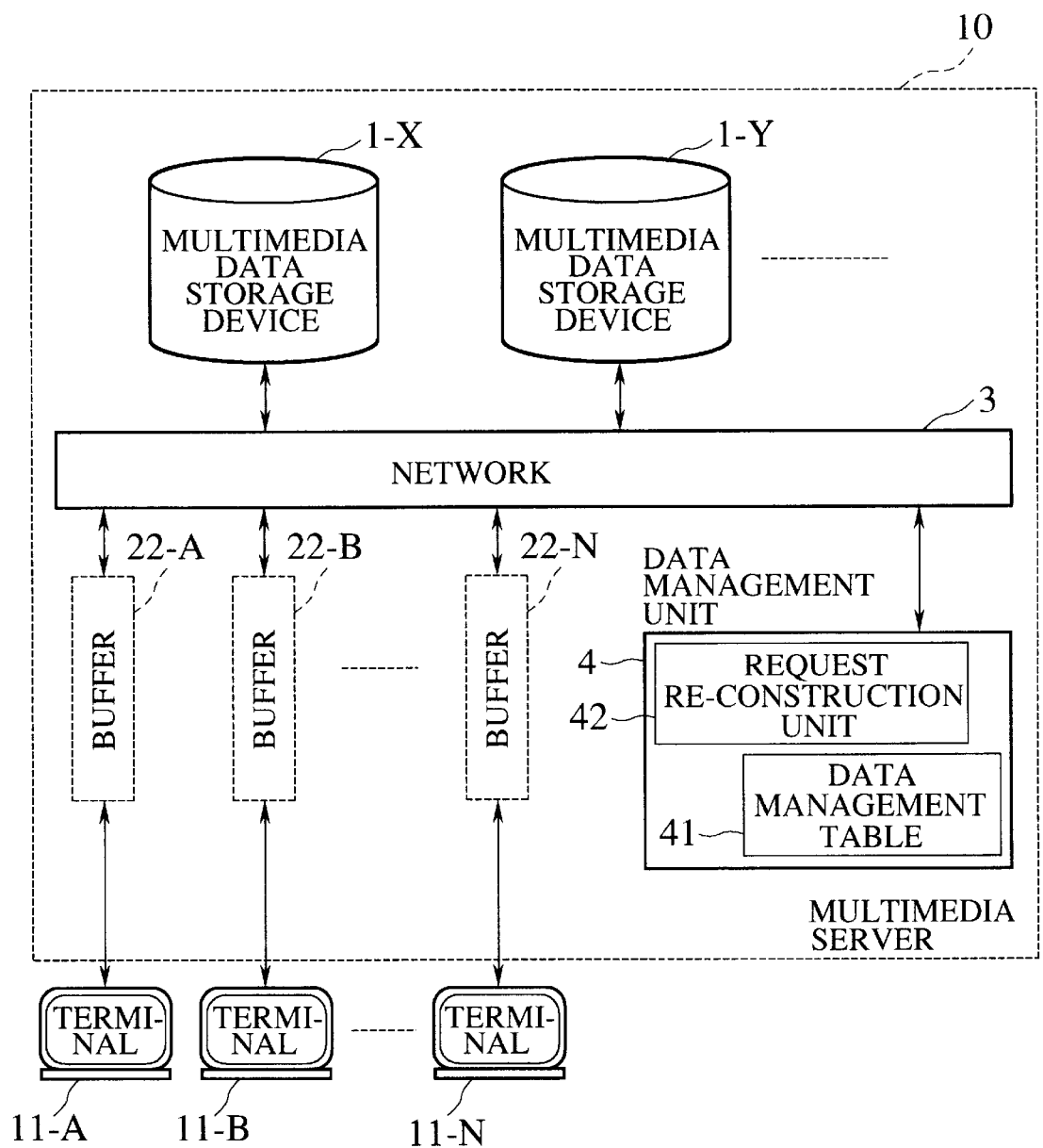

MULTIMEDIA SERVER WITH EFFICIENT MULTIMEDIA DATA ACCESS SCHEME

BACKGROUND OF THE INVENTION

1. Field of the Invention

The present invention relates to a multimedia server for transferring multimedia data to terminals in response to requests from terminals.

2. Description of the Background Art

In general, as a memory device for storing multimedia data to be used in a video server, a memory device with a capacity larger than that of a conventional memory device for text data is required. However, a memory device such as a semiconductor memory device which enables a high speed access but which also requires a high cost per capacity is not suitable as a storage of multimedia data. Consequently, a memory device such as a magnetic memory device or an optical memory device for which an access speed is not so fast but a capacity is large and a cost is not so high has been often used as a storage of multimedia data.

In addition, in a case of transferring video data and/or speech data to a terminal, a video server is required to have a data supply capability higher than a data reproduction capability of the terminal.

A multimedia server including a video server is required to be capable of responding to many requires from many users immediately, but an access speed of a memory device can be a bottleneck when accesses are concentrated on a particular memory device storing popular multimedia data, and it can lead to a lowering of a performance of a system as a whole. A conventional measure to resolve this problem includes a provision to shorten the access time by caching data in a cache memory with a small capacity but a high access speed, and a provision to provide a plurality of memory devices in parallel to realize a data transfer with a reduced access load on each memory device.

However, in a case of multimedia data such as video data, each data requires a large capacity, so that a cache memory with a large capacity is necessary in order to realize an effective caching, and there is a need to devise a scheme to distribute accesses to different memory devices in a case of providing a plurality of memory devices in parallel.

Moreover, a scheme for handling all requests within a prescribed time period collectively such as a near video-on-demand scheme can avoid a concentration of accesses to a particular memory device to some extent by processing accesses to the identical data collectively, but in this scheme, data transferred from the server are uncontrollable at each terminal, and there is a time lag between a time at which a request is made and a time at which data are provided.

Thus, in a conventional multimedia server, there has been a need to take out the identical multimedia data repeatedly from a memory device having a low access speed. In particular, in a case of the video server, many accesses are often concentrated on a famous video program or a new or topical video program, so that there has been a demand for an efficient scheme to handle many accesses to the identical multimedia data.

SUMMARY OF THE INVENTION

It is therefore an object of the present invention to provide a multimedia server capable of reducing a number of accesses to memory devices with low access speed, so as to realize a large scale multimedia server with an improved performance in interactive operations.

According to one aspect of the present invention there is provided a multimedia server apparatus, comprising: at least one multimedia data storage device for storing multimedia data; at least one input/output unit having a plurality of buffers, each input/output unit being connected with at least one corresponding terminal and having at least one buffer for temporarily storing the multimedia data to be transferred to the corresponding terminal; and a data management unit for managing data transfer among the multimedia data storage device and buffers of said at least one input/output unit, by judging whether a desired multimedia data requested by one terminal connected with one buffer of said at least one input/output unit is present in another buffer of said at least one input/output unit other than said one buffer, and controlling the multimedia data storage device and said at least one input/output unit to transfer the desired multimedia data to said one buffer from the multimedia data storage device when the desired multimedia data is judged as not present, or from said another buffer when the desired multimedia data is judged as present.

According to another aspect of the present invention there is provided a multimedia server apparatus, comprising: at least one multimedia data storage device for storing multimedia data; at least one input/output unit having a plurality of buffers, each input/output unit being connected with at least one corresponding terminal and having at least one buffer for temporarily storing the multimedia data to be transferred to the corresponding terminal; network means for connecting the multimedia data storage device and said at least one input/output unit, through which the multimedia data are transferred; prediction means for predicting future necessary multimedia data which will be necessary in future at each buffer of said at least one input/output unit; and pre-fetch means for monitoring the multimedia data transferred through the network means, and pre-fetching the future necessary multimedia data predicted by the prediction means from the multimedia data transferred through the network means into each buffer of said at least one input/output unit.

According to another aspect of the present invention there is provided a multimedia server apparatus, comprising: at least one multimedia data storage device for storing multimedia data; at least one input/output unit having a plurality of buffers, each input/output unit being connected with at least one corresponding terminal and having at least one buffer for temporarily storing the multimedia data to be transferred to the corresponding terminal; and a data management unit for managing data access to the multimedia data storage device and data transfer to buffers of said at least one input/output unit, by combining a plurality of requests for an identical multimedia data issued by different terminals connected with different buffers of said at least one input/output unit within a prescribed period of time into a single unified request, making a single access to the identical multimedia data in the multimedia data storage device according to the single unified request, and transferring the identical multimedia data obtained by the single access to said different buffers of said at least one input/output unit simultaneously.

According to another aspect of the present invention there is provided a multimedia server apparatus, comprising: at least one multimedia data storage device for storing multimedia data; at least one input/output unit having a plurality of buffers, each input/output unit being connected with at least one corresponding terminal and having at least one buffer for temporarily storing the multimedia data to be transferred to the corresponding terminal; and a data management unit for managing data transfer among the multimedia data storage device and buffers of said at least one input/output unit, by selecting one of the multimedia data storage device and buffers of said at least one input/output unit which stores a desired multimedia data requested by one terminal connected with one buffer of said at least one input/output unit and which enables fastest access to the desired multimedia data, and controlling said one of the multimedia data storage device and buffers of said at least one input/output unit to transfer the desired multimedia data to said one buffer of said at least one input/output unit.

According to another aspect of the present invention there is provided a data access method in a multimedia server having at least one multimedia data storage device for storing multimedia data and at least one input/output unit having a plurality of buffers, each input/output unit being connected with at least one corresponding terminal and having at least one buffer for temporarily storing the multimedia data to be transferred to the corresponding terminal, the method comprising the steps of: judging whether a desired multimedia data requested by one terminal connected with one buffer of said at least one input/output unit is present in another buffer of said at least one input/output unit other than said one buffer; and controlling the multimedia data storage device and said at least one input/output unit to transfer the desired multimedia data to said one buffer from the multimedia data storage device when the desired multimedia data is judged as not present, or from said another buffer when the desired multimedia data is judged as present.

According to another aspect of the present invention there is provided a data access method in a multimedia server having at least one multimedia data storage device for storing multimedia data, at least one input/output unit having a plurality of buffers, each input/output unit being connected with at least one corresponding terminal and having at least one buffer for temporarily storing the multimedia data to be transferred to the corresponding terminal, and network means for connecting the multimedia data storage device and said at least one input/output unit, through which the multimedia data are transferred, the method comprising the steps of: predicting future necessary multimedia data which will be necessary in future at each buffer of said at least one input/output unit; and monitoring the multimedia data transferred through the network means, and pre-fetching the future necessary multimedia data predicted at the predicting step from the multimedia data transferred through the network means into each buffer of said at least one input/output unit.

According to another aspect of the present invention there is provided a data access method in a multimedia server having at least one multimedia data storage device for storing multimedia data, and at least one input/output unit having a plurality of buffers, each input/output unit being connected with at least one corresponding terminal and having at least one buffer for temporarily storing the multimedia data to be transferred to the corresponding terminal, the method comprising the steps of: combining a plurality of requests for an identical multimedia data issued by different terminals connected with different buffers of said at least one input/output unit within a prescribed period of time into a single unified request; making a single access to the identical multimedia data in the multimedia data storage device according to the single unified request; and transferring the identical multimedia data obtained by the single access to buffers of said different buffers of said at least one input/output unit simultaneously.

According to another aspect of the present invention there is provided a data access method in a multimedia server having at least one multimedia data storage device for storing multimedia data, and at least one input/output unit having a plurality of buffers, each input/output unit being connected with at least one corresponding terminal and having at least one buffer for temporarily storing the multimedia data to be transferred to the corresponding terminal, the method comprising the steps of: selecting one of the multimedia data storage device and buffers of said at least one input/output unit which stores a desired multimedia data requested by one terminal connected with one buffer of said at least one input/output unit and which enables fastest access to the desired multimedia data; and controlling said one of the multimedia data storage device and buffers of said at least one input/output unit to transfer the desired multimedia data to said one buffer of said at least one input/output unit.

Other features and advantages of the present invention will become apparent from the following description taken in conjunction with the accompanying drawings.

BRIEF DESCRIPTION OF THE DRAWINGS

FIG. 11 is an illustration of an exemplary format of a data management table in the multimedia server of FIG. 10.

FIG. 12 is an illustration of one exemplary content of a data management table in the multimedia server of FIG. 10.

FIG. 13 is an illustration of another exemplary content of a data management table in the multimedia server of FIG. 10.

FIG. 14 is an illustration of another exemplary content of a data management table in the multimedia server of FIG. 10.

FIG. 15 is an illustration of another exemplary content of a data management table in the multimedia server of FIG. 10.

FIG. 17 is an illustration of one exemplary content of a data management table in the multimedia server of FIG. 16.

FIG. 18 is an illustration of another exemplary content of a data management table in the multimedia server of FIG. 16.

FIG. 19 is a block diagram of the fifth embodiment of a multimedia server according to the present invention.

DETAILED DESCRIPTION OF THE PREFERRED EMBODIMENTS

Referring now to FIG. 1 to FIG. 4, the first embodiment of a multimedia server according to the present invention will be described in detail.

Figure 1:
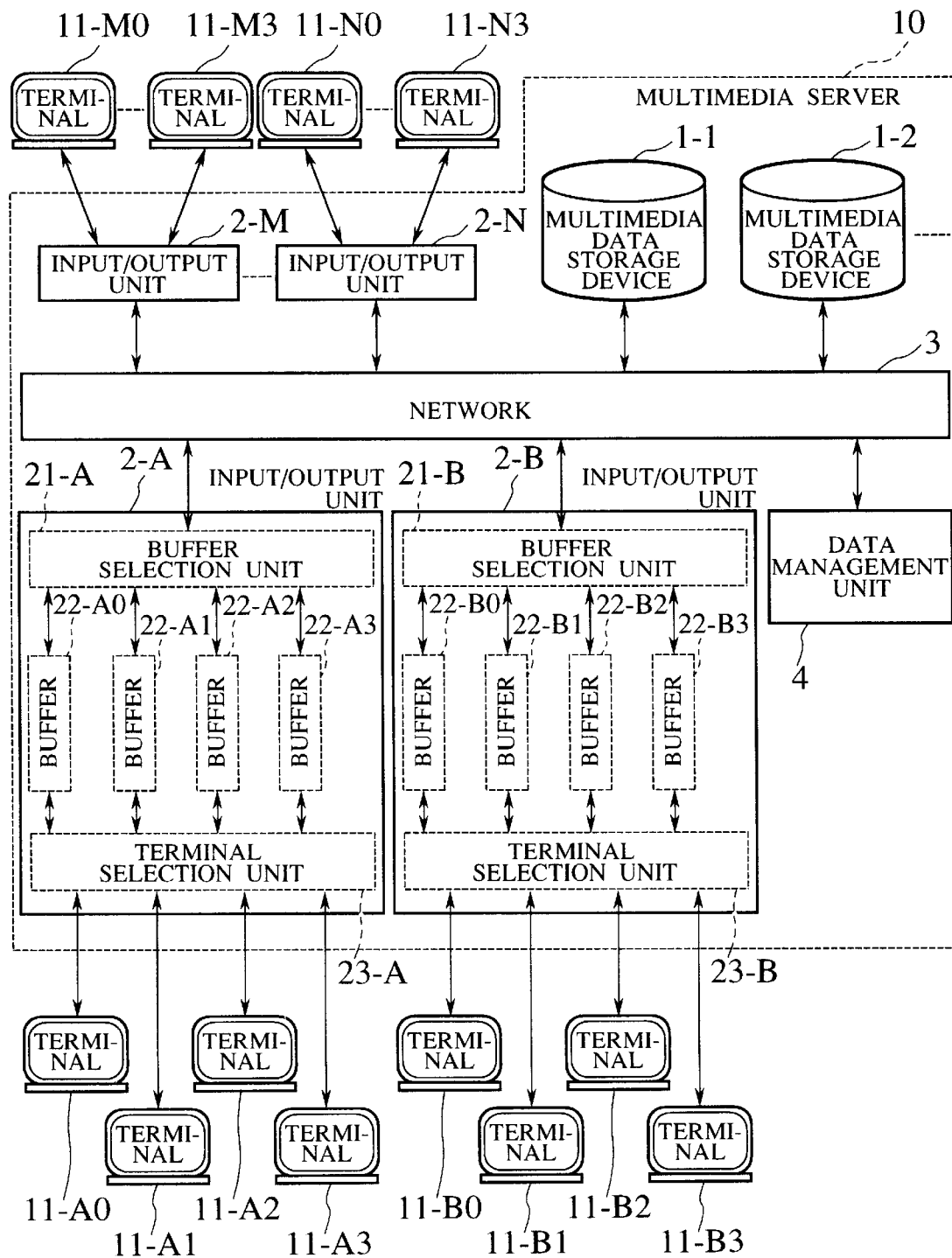
FIG. 1 is a block diagram of the first embodiment of a multimedia server according to the present invention.

FIG. 1 shows a configuration of a multimedia server 10 in the first embodiment, which comprises: a plurality of multimedia data storage devices 1 (1-1, 1-2, and so on); a plurality of input/output units 2 (2-A to 2-N); a data management unit 4; and a network 3 connecting these multimedia data storage devices 1, the input/output units 2, and the data management unit 4 each other.

Each input/output unit 2 is also connected with one or more terminals 11 (such as 11-A0 to 11-A3 for the input/output unit 2-A, and so on), and includes: a buffer selection unit 21 (21-A, 21-B, and so on) connected with the network 3; a terminal selection unit 23 (23-A, 23-B, and so on) connected with the terminals 11; and a plurality of buffers 22 (22-A0 to 22-A3 of the input/output unit 2-A, and so on) connected between the buffer selection unit 21 and the terminal selection unit 23.

In this multimedia server 10, in response to a request from a terminal 11, an access to requested multimedia data stored in the multimedia data storage devices 1 is made, and the requested multimedia data are taken into buffers 22 of the input/output unit 2 to which the requesting terminal 11 is connected. In a case where this multimedia server 10 is constructed by a single computer, for example, the network 3 corresponds to a high speed local bus within the computer. Also, in a case where this multimedia server 10 is constructed by a parallel computer formed by a plurality of processors, the network 3 corresponds to a network for connecting these processors.

For the multimedia data storage devices 1, any memory devices capable of storing multimedia data such as magnetic disks, optical disks, opto-magnetic disks, silicon disks, or magnetic tapes, or devices capable of acquiring various types of data such as televisions, cameras, microphones, scanners, or sensors can be used. In general, the multimedia data storage device 1 has an access speed slower than that of the buffer 22 of the input/output unit 2. The multimedia data transferred through the network 3 are stored into a vacant buffer 22 within the input/output unit 2 which is selected by the buffer selection unit 21. Each buffer 22 is a temporary memory used for the purpose of synchronizing a higher speed data transfer on the network 3 and a lower speed data transfer with respect to the terminal 11. The multimedia data stored in the buffer 22 are selectively transferred to an appropriate terminal 11 which is selected by the terminal selection unit 23.

The data management unit 4 manages the multimedia data stored in the multimedia data storage devices 1 and the buffers 22 of the input/output units 2. In FIG. 1, the data management unit 4 is depicted as a single independent unit, but the data management unit 4 may be provided within each input/output unit 2, or any other suitable unit. In addition, the data management unit 4 may be provided distributedly.

Each terminal 11 can be any device capable of issuing a request with respect to the multimedia server 10, and utilizing (reproducing) the multimedia data transferred from the multimedia server 10. Each terminal 11 may also issue data so that data stored in each terminal 11 can be accessed from the multimedia server 10 or other terminals 11.

When one terminal 11-A0 requests data J stored in the multimedia data storage device 1-1 to the multimedia server 10, the request issued by the terminal 11-A0 is given to the input/output unit 2-A, and In response, the input/output unit 2-A inquires the data management unit 4 about a device storing the requested data J. When it is ascertained that the data J is stored in the multimedia data storage device 1-1, this data J is transferred from the multimedia data storage device 1-1 to the input/output unit 2-A via the network 3. Then, the buffer selection unit 21-A stores this data J transferred from the multimedia data storage device 1-1 into a vacant buffer 22 (assumed to be a buffer 22-A0 here) in the input/output unit 2-A, and the terminal selection unit 23-A transfers this data J stored in the buffer 22-A0 to the terminal 11-A0 which requested this data J.

Next, when another terminal 11-A3 requested the same data J as previously requested by the terminal 11-A0, the input/output unit 2-A recognizes that this data J is stored in the buffer 22-A0 of this input/output unit 2-A, and transfers this data J stored in the buffer 22-A0 to the terminal 11-A3 via the terminal selection unit 23-A. When the input/output unit 2-A is not aware of the fact that this data J is stored in the buffer 22-A0 of this input/output unit 2-A, the input/output unit 2-A inquires the data management unit 4 about a device storing the requested data J, as the data management unit 4 knows which data is stored in which buffer.

When another terminal 11-B0 connected to another input/output unit 2-B tries to obtain this data J at this point, the input/output unit 2-B inquires the data management unit 4 about a device storing this data J. In this case, the data J is stored in the multimedia data storage device 1-1 as well as in the buffer 22-A0 of the input/output unit 2-A. As already mentioned above, the buffer 22-A0 is capable of accessing the stored data faster than the multimedia data storage device 1-1, so that the data J is transferred from the buffer 22-A0 of the input/output unit 2-A to the input/output unit 2-B in this case. Then, the buffer selection unit 21-B stores this data J transferred from the input/output unit 2-A into a vacant buffer 22 (assumed to be a buffer 22-B0 here) in the input/output unit 2-B, and the terminal selection unit 23-B transfers this data J stored in the buffer 22-B0 to the terminal 11-B0 which requested this data J.

Figure 2:
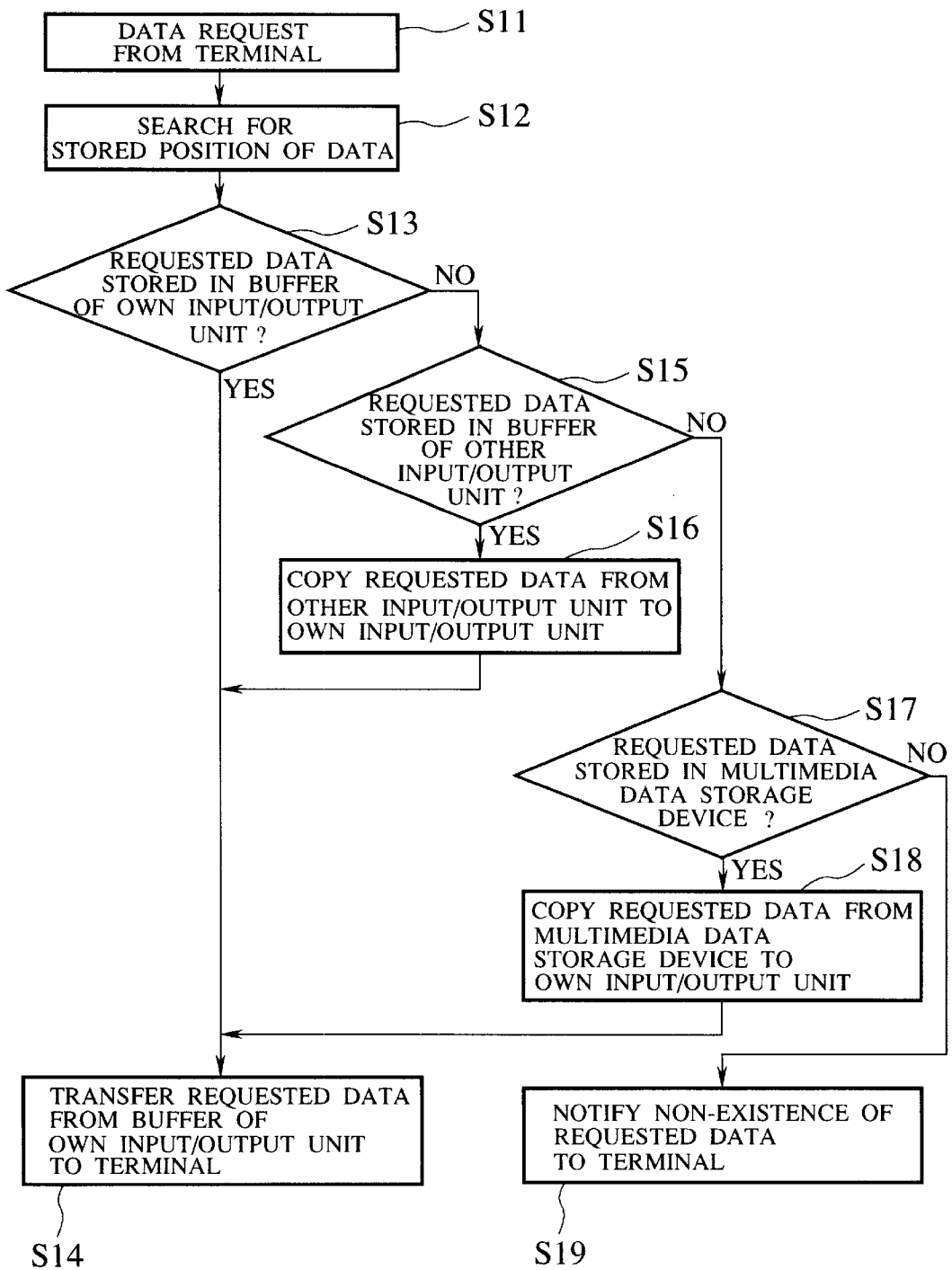
FIG. 2 is a flow chart for the operation in the multimedia server of FIG. 1.

FIG. 2 is a flow chart showing a flow of this processing which proceeds as follows.

When a data request from a terminal 11 is issued (step S11), the input/output unit 2 connected with this terminal 11 searches for a stored position of the requested data by inquiring to the data management unit 4 (step S12).

Next, whether the requested data is stored in the buffer 22 of the own input/output unit 2 or not is judged (step S13). If so, this input/output unit 2 transfers the requested data from that buffer 22 of the own input/output unit 2 to the requesting terminal 11 immediately (step S14).

If the requested data is not stored in the buffer 22 of the own input/output unit 2, whether the requested data is stored in the buffer 22 of the other input/output unit 2 or not is judged (step S15). If so, the requested data is copied from that buffer 22 of the other input/output unit 2 to the buffer 22 of the own input/output unit 2 (step S16), and then this input/output unit 2 transfers the requested data from that buffer 22 of the own input/output unit 2 to the requesting terminal 11 (step S14).

If the requested data is not stored in the buffer 22 of the other input/output unit 2 either, whether the requested data is stored in the multimedia data storage device 1 or not is judged (step S17). If so, the requested data is copied from that multimedia data storage device 1 to the buffer 22 of the own input/output unit 2 (step S18), and then this input/output unit 2 transfers the requested data from that buffer 22 of the own input/output unit 2 to the requesting terminal 11 (step S14).

If the requested data is not stored in any of the multimedia data storage devices 1 either, this input/output unit 2 notifies the non-existence of the requested data to the requesting terminal 11 (step S19), and the processing is terminated.

It is to be noted here that, in the above described processing, instead of searching out a stored position of the requested data at once at the step S12, the steps S13, S15 and S17 may sequentially check whether the requested data is stored in the buffer 22 of the own input/output unit 2 or not, whether the requested data is stored in the buffer 22 of the other input/output unit 2 or not, and whether the requested data is stored in the multimedia data storage device 1 or not, respectively.

As described, in this first embodiment, the multimedia data read out from the multimedia data storage device 1 is usually taken into the buffer 22 of the input/output unit 2, but when the desired multimedia data is stored in the buffer 22 of the other input/output unit 2, the desired multimedia data is taken from that buffer 22 of the other input/output unit 2. Consequently, it is possible to reduce a number of accesses with respect to the multimedia data storage device 1 that could otherwise be the bottleneck of the multimedia server 10. In addition, a probability for the desired multimedia data to exist in the buffer 22 of the other input/output unit 2 increases as much as a level of concentration of the requests from a plurality of terminals 11 becomes high, so that a probability for being able to obtain the necessary data from the nearby input/output unit 2 immediately also increases in such a case.

Therefore, even when many requests are concentrated on the identical data, accesses will not be concentrated on a single multimedia data storage device, so that it is highly unlikely for this multimedia server to have the bottleneck at the multimedia data storage device. In addition, the same data are sporadically stored at scattered positions, so that it is possible to obtain the desired multimedia data from nearby position, and therefore a load on the network within the multimedia server can also be reduced. Moreover, the desired multimedia data is obtained from the buffer with a high access speed whenever possible, so that a response time with respect to the terminal can also be shortened.

Figure 3:
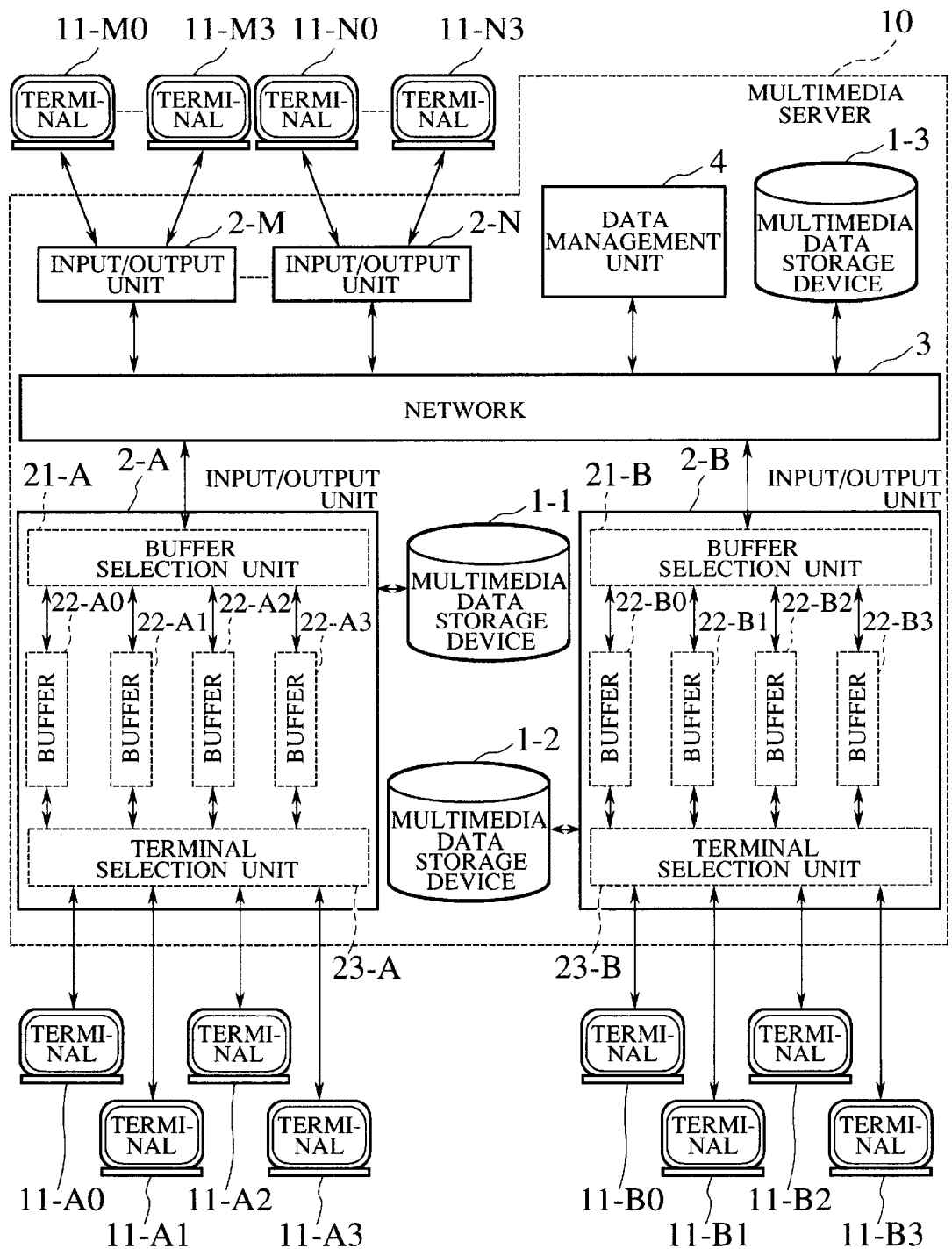
FIG. 3 is a block diagram of one modification of the multimedia server of FIG. 1.

FIG. 3 shows one modification of the first embodiment described above, in which the multimedia data storage devices 1-1 and 1-2 are directly connected to the input/output units 2-A and 2-B, respectively. The first embodiment as described above is equally valid for such a modified configuration with directly connected multimedia data storage devices 1 and the input/output units 2. Here, the multimedia data storage devices 1 may be directly connected with only some of the input/output units 2, and the multimedia server 10 may mixedly contain those multimedia data storage devices 1 which are directly connected with some input/output units 2 and those multimedia data storage devices 1 which are connected only with the network 3, as shown in FIG. 3.

Figure 4:
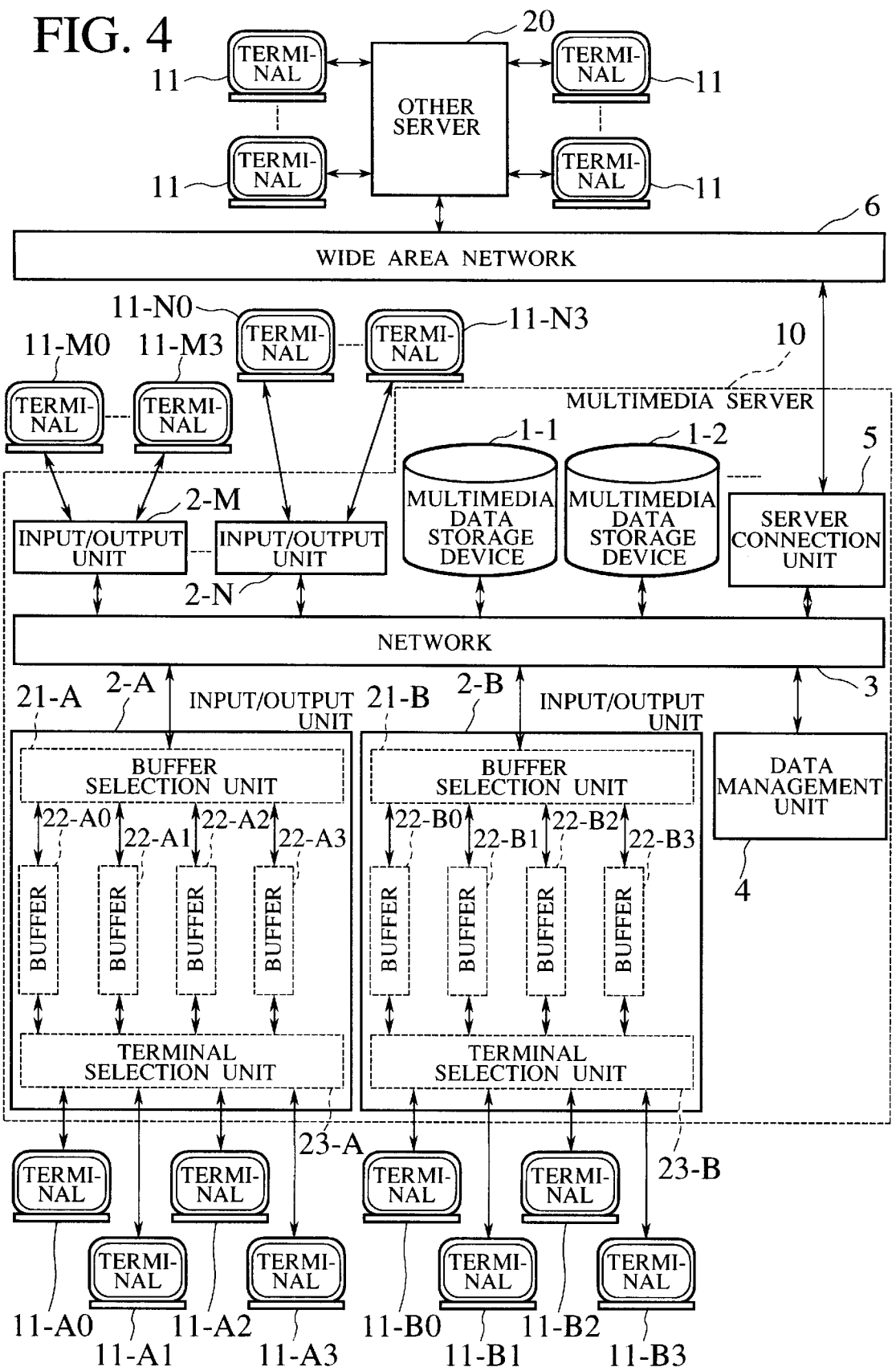
FIG. 4 is a block diagram of another modification of the multimedia server of FIG. 1.

FIG. 4 shows another modification of the first embodiment described above, in which the multimedia server 10 of FIG. 1 is further connected with other server 20 via a wide area network 6.

In this case, when a request for data K is issued from the terminal 11-A0, for example, the input/output unit 2-A inquires the data management unit 4 as to whether the requested data K is stored in this multimedia server 10 or not, and if not, the input/output unit 2-A inquires the other server 20 as to whether the requested data K is stored in that other server 20 or not, via a server connection unit 5. If the other server 20 stores the requested data K, the requested data K is transferred from that other server 20 to this input/output unit 2-A of the multimedia server 10. Here, the input/output unit 2-A may inquire the other server 20 as to whether the data K is stored there via the server connection unit 5 at the same time as it inquires the data management unit 4 of this multimedia server 10 as to whether the data K is stored there.

In this first embodiment, the input/output unit 2 directly inquires the other server 20 as to whether the requested data is stored there via the server connection unit 5, but there will be no need to inquire the other server 20 about the requested data using the wide area network 6, if a data management unit for the other server is provided within this multimedia server 10 in addition. It may also be possible for the data management unit 4 of this multimedia server 10 to have the management information concerning the data stored in the other server 20 as well.

Conversely, this multimedia server 10 can provide a service with respect to the other server 20 when a request or an inquiry about the data is given from the other server 20 via the wide area network 6 and the server connection unit 5, just as in a case of a request from the terminal 11 connected to this multimedia server 10.

It is to be noted that, in the first embodiment described above, one buffer 22 is provided in correspondence to one terminal 11, but there is no need to allocate buffers 22 in this particular manner. Also, in the above description, a number of buffers 22 in each input/output unit 2 is set equal to a number of terminals connected to each input/output unit 2, but they may be different, if desired.

It is also to be noted that, in the first embodiment described above, the requested data is directly taken into the buffer 22 from the multimedia data storage device 1 which stores the requested data, but the requested data may be taken into the buffer 22 after it is once taken into some other memory device such as a cache memory from the multimedia data storage device 1.

Figure 5:
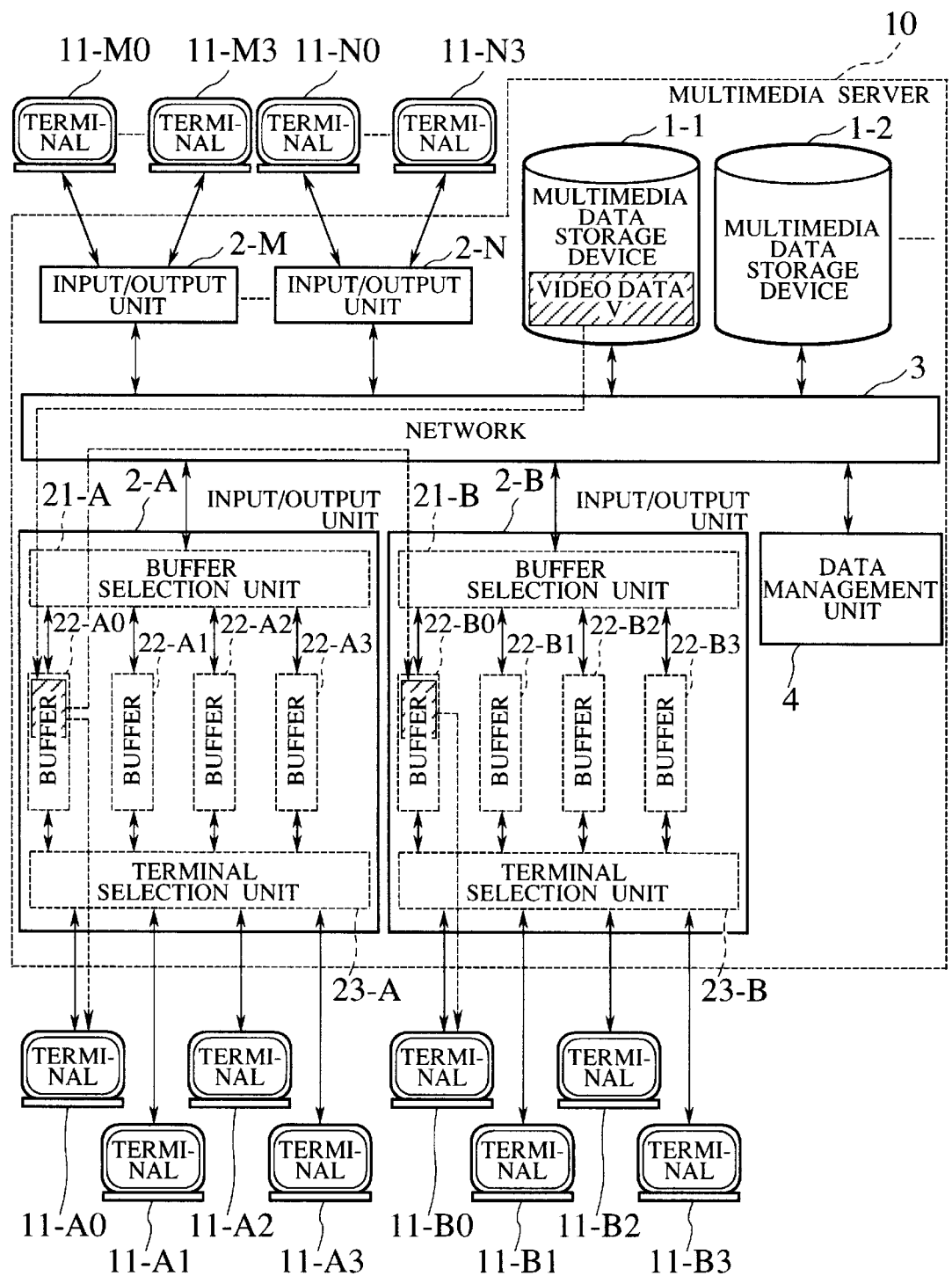
FIG. 5 is a block diagram of the second embodiment of a multimedia server according to the present invention.
Figure 6:
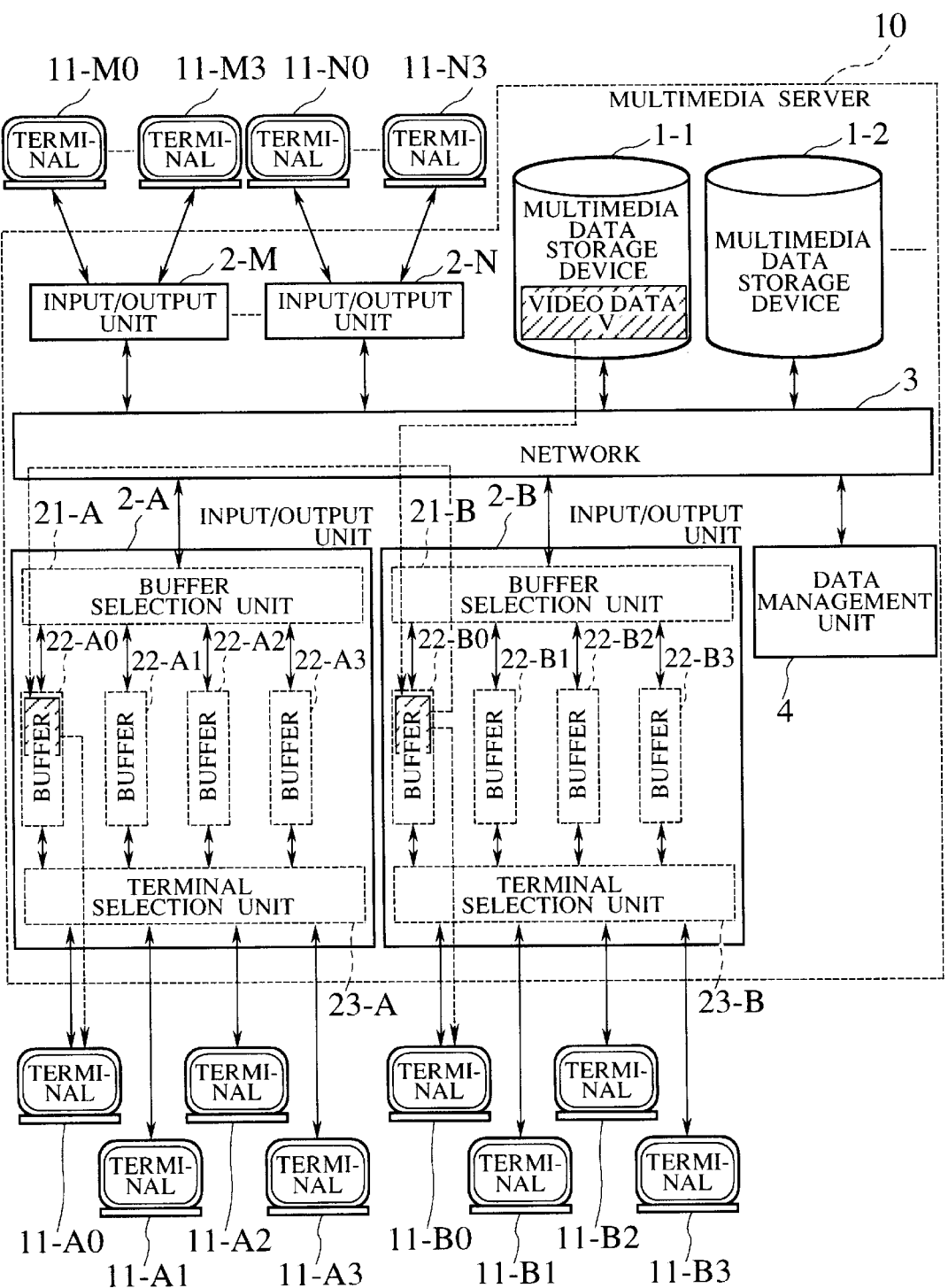
FIG. 6 is a block diagram of the multimedia server of FIG. 5 in a different operation state.

Referring now to FIG. 5 and FIG. 6, the second embodiment of a multimedia server according to the present invention will be described in detail.

This second embodiment is directed to a case of the multimedia server such as a video server (for video-on-demand) which is required to provide data in large size or data to be provided in real time.

The multimedia server 10 of FIG. 5 has a configuration basically similar to that of FIG. 1 described above. In this multimedia server 10 of FIG. 5, when a request for a video data V of a particular video program is issued from the terminal 11-A0, the input/output unit 2-A connected with this terminal 11-A0 inquires the data management unit 4 about a stored position of the requested video data V.

When this video data V is stored only in the multimedia data storage device 1, this video data V is transferred from that multimedia data storage device 1 to a vacant buffer 22 (assumed to be the buffer 22-A0 here) selected by the buffer selection unit 21-A in the input/output unit 2-A. Here, when the video data V has a size larger than a capacity of the buffer 22-A0, this video data V cannot be entered into the buffer 22-A0 entirely, so that only a part of this video data V which can be stored in the buffer 22-A0 is transferred to the buffer 22-A0.

There is a need for the input/output unit 2-A to sequentially update the data stored in the buffer 22-A0 in accordance with a progress of video program reproduction at the terminal 11, and for this reason, the data management unit 4 manages a time in the video program corresponding to a part of the video data V stored in the buffer 22-A0 of the input/output unit 2-A.

At this point when a request for the same video data V is issued from another terminal 11-B0, the input/output unit 2-B connected with this terminal 11-B0 inquires the data management unit 4 about a stored position of the requested video data V. In this case, the video data V is also stored in the buffer 22-A0 of the input/output unit 2-A as well as in the multimedia data storage device 1, but the buffer 22-A0 only stores a part of the video data V.

Here, if a time t in the video program requested by the input/output unit 2-B is included in a part of the video data V stored in the buffer 22-A0, this video data V is transferred from the buffer 22-A0 of the input/output unit 2-A to the input/output unit 2-B, and stored into a vacant buffer (assumed to be the buffer 22-B0 here) selected by the buffer selection unit 21-B in the input/output unit 2-B. On the other hand, if a time t in the video program requested by the input/output unit 2-B is not included in a part of the video data V stored in the buffer 22-A0, this video data V is transferred from the multimedia data storage device 1 to the input/output unit 2-B. Note that, in a case of transferring the video data V from the buffer 22-A0 of the input/output unit 2-A to the input/output unit 2-B, the input/output unit 2-A should not delete or overwrite the video data V stored in the buffer 22-A0 before this video data V is transferred to the input/output unit 2-B.

As shown in FIG. 5, when the video data V is to be transferred from the multimedia data storage device 1-1 to the buffer 22-A0 of the input/output unit 2-A, then from the buffer 22-A0 of the input/output unit 2-A to the terminal 11-A0 and the buffer 22-B0 of the input/output unit 2-B, and further from the buffer 22-B0 of the input/output unit 2-B to the terminal 11-B0, there are cases in which in which the buffer 22-B0 of the input/output unit B0 requires the data of a time later than that of the data stored in the buffer 22-A0 of the input/output unit 2-A, depending on communication rates between the input/output units 2 and the terminals 11 or needs to carry out operations such as fast forward, pause, or reverse playback mode operations with respect to the video data.

In this case, the input/output unit 2-B inquires the data management unit 4 about a stored position of the necessary data, and receives the necessary data transferred to the buffer 22-B0 from there (multimedia data storage device 1-1). At this point, there can be a possibility for a future need to transfer the data from the buffer 22-B0 to the buffer 22-A0, so that the input/output unit 2-A inquires the data management unit 4 about a transfer destination of the data from the buffer 22-A0. When it is possible to transfer the data from the buffer 22-B0 to the buffer 22-A0, the data is to be transferred to the buffer 22-A0 from the buffer 22-B0 rather than the multimedia data storage device 1-1. This situation is indicated in FIG. 6.

It is possible to apply the modification of FIG. 3 described above to this second embodiment as well. In other words, the second embodiment as described above is equally valid for a modified configuration with directly connected multimedia data storage devices 1 and the input/output units 2. Here, the multimedia data storage devices 1 may be directly connected with only some of the input/output units 2, and the multimedia server 10 may mixedly contain those multimedia data storage devices 1 which are directly connected with some input/output units 2 and those multimedia data storage devices 1 which are connected only with the network 3.

It is also possible to apply the modification of FIG. 4 described above to this second embodiment as well. In other words, the multimedia server of this second embodiment can be further connected with other server via a wide area network.

In this case, when a request for data K is issued from the terminal 11-A0, for example, the input/output unit 2-A inquires the data management unit 4 as to whether the requested data K is stored in this multimedia server 10 or not, and if not, the input/output unit 2-A inquires the other server as to whether the requested data K is stored in that other server or not via a server connection unit. If the other server stores the requested data K, the requested data K is transferred from that other server to this input/output unit 2-A of the multimedia server 10. Here, the input/output unit 2-A may inquire the other server as to whether the data K is stored there via the server connection unit at the same time as it inquires the data management unit 4 of this multimedia server 10 as to whether the data K is stored there.

In the above case, the input/output unit 2 directly inquires the other server as to whether the requested data is stored there via the server connection unit, but there will be no need to inquire the other server about the requested data using the wide area network, if a data management unit for the other server is provided within this multimedia server 10 in addition. It may also be possible for the data management unit 4 of this multimedia server 10 to have the management information concerning the data stored in the other server as well.

Conversely, this multimedia server 10 can provide a service with respect to the other server when a request or an inquiry about the data is given from the other server via the wide area network and the server connection unit, just as in a case of a request from the terminal 11 connected to this multimedia server 10.

It is to be noted that, in the second embodiment described above, one buffer 22 is provided in correspondence to one terminal 11, but there is no need to allocate buffers 22 in this particular manner. Also, in the above description, a number of buffers 22 in each input/output unit 2 is set equal to a number of terminals connected to each input/output unit 2, but they may be different, if desired.

It is also to be noted that, in the second embodiment described above, the requested data is directly taken into the buffer 22 from the multimedia data storage device 1 which stores the requested data, but the requested data may be taken into the buffer 22 after it is once taken into some other memory device (capable of realizing accesses at least as fast as the multimedia data storage device 1) such as a cache memory from the multimedia data storage device 1. In this manner, the data associated with a high access frequency at a moment can be obtained at high speed.

When a request for the video data V is issued from the terminal which is also connected to the input/output unit 2-A but which is different from the terminal 11-A0 (such as the terminal 11-Al, 11-A2, or 11-A3), if the data stored in the buffer 22-A0 of this input/output unit 2-A is utilizable, the data may be directly transferred from the buffer 22-A0, or the data may be transferred after being copied to some other vacant buffer once.

Figure 7:
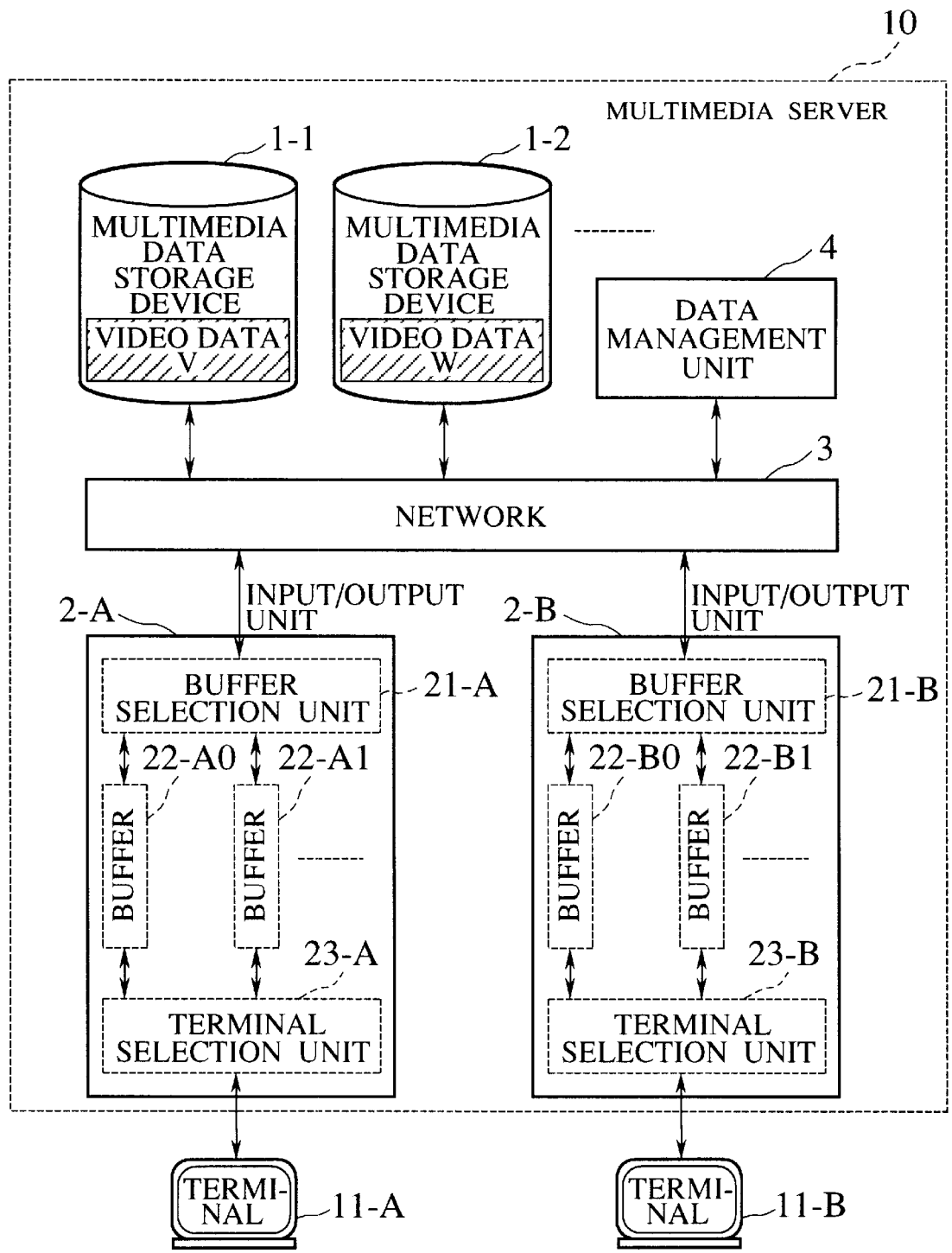
FIG. 7 is a block diagram of the third embodiment of a multimedia server according to the present invention.
Figure 8:
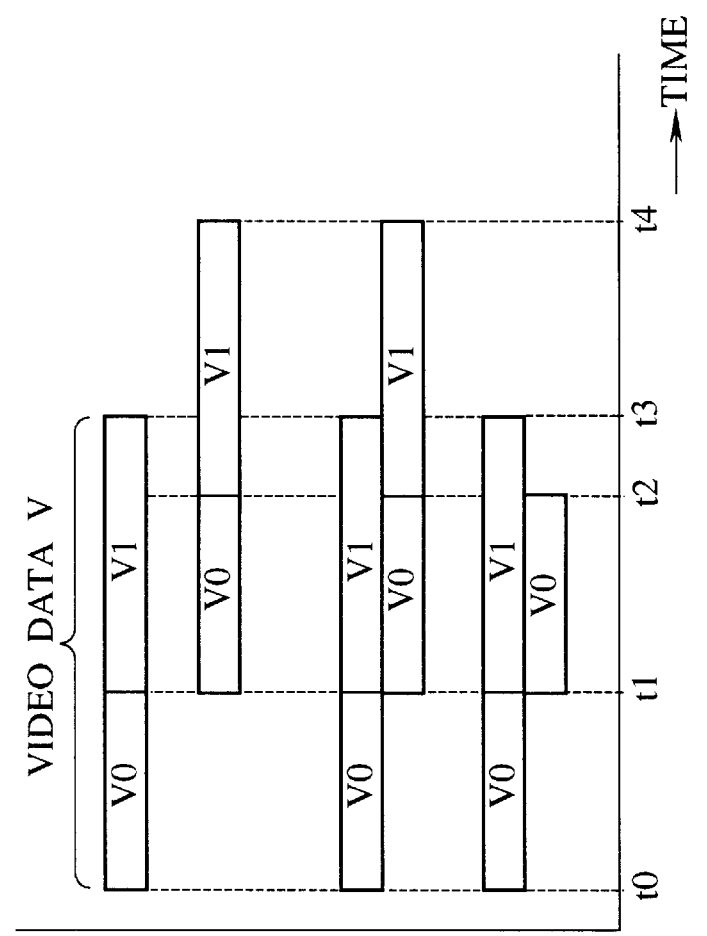
FIG. 8 is a timing chart for data flowing in the network of the multimedia server of FIG. 7.
Figure 9:
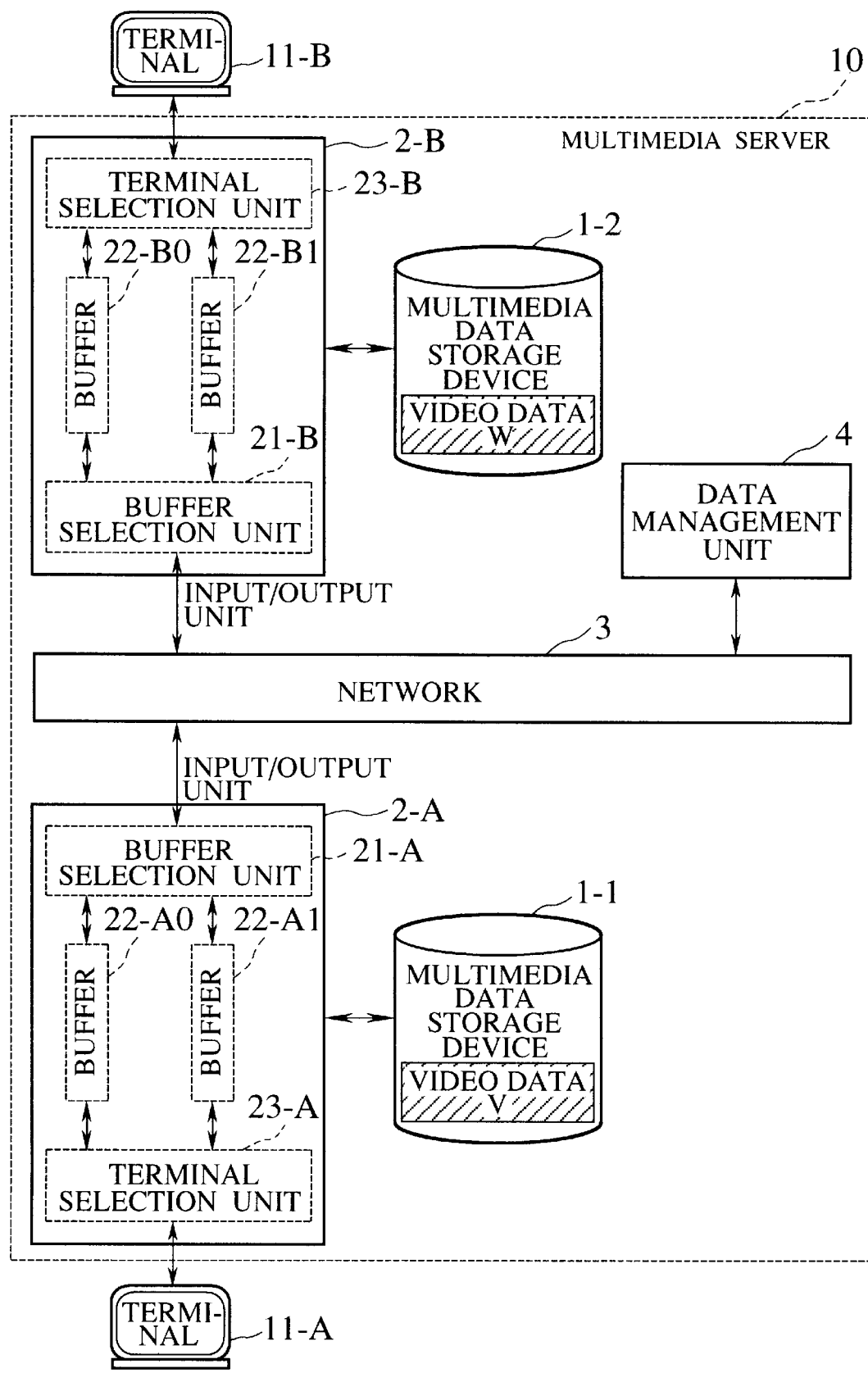
FIG. 9 is a block diagram of one modification of the multimedia server of FIG. 7.

Referring now to FIG. 7 to FIG. 9, the third embodiment of a multimedia server according to the present invention will be described in detail.

The multimedia server 10 of FIG. 7 has a configuration basically similar to that of FIG. 1 described above, which comprises: a plurality of multimedia data storage devices 1 (1-1, 1-2, and so on); a plurality of input/output units 2 (2-A, 2-B); a data management unit 4; and a network 3 connecting these multimedia data storage devices 1, the input/output units 2, and the data management unit 4 each other.

Each input/output unit 2 is also connected with a terminal 11 (a terminal 11-A for the input/output unit 2-A, a terminal 11-B for the input/output unit 2-B), and includes: a buffer selection unit 21 (21-A, 21-B) connected with the network 3; a terminal selection unit 23 (23-A, 23-B) connected with the terminal 11; and a plurality of buffers 22 (22-A0, 22-A1, and so on of the input/output unit 2-A, 22-B0, 22-B1, and so on of the input/output unit 2-B) connected between the buffer selection unit 21 and the terminal selection unit 23, so as to enable accesses to the multimedia data stored in the multimedia data storage devices 1 from each terminal 11.

The network 3 is multiplexed (assumed to be doubled in the following) by a multiplexing scheme such as a frequency division multiple access scheme, for example, so that a plurality of multimedia data can be transferred simultaneously to arbitrary input/output units 2.

For the multimedia data storage devices 1, any memory devices capable of storing multimedia data such as magnetic disks, optical disks, opto-magnetic disks, silicon disks, or magnetic tapes, or devices capable of acquiring various types of data such as televisions, cameras, microphones, scanners, or sensors can be used. In general, the multimedia data storage device 1 has an access speed slower than that of the buffer 22 of the input/output unit 2, so that the multimedia data storage device 1 will be assumed to be having an access speed slower than that of the buffer 22 of the input/output unit 2 in the following.

The multimedia data transferred through the network 3 are stored into a vacant buffer 22 within the input/output unit 2 which is selected by the buffer selection unit 21. The multimedia data stored in the buffer 22 are selectively transferred to an appropriate terminal 11 which is selected by the terminal selection unit 23.

The data management unit 4 manages the multimedia data stored in the multimedia data storage devices 1 and the buffers 22 of the input/output units 2. In FIG. 7, the data management unit 4 is depicted as a single independent unit, but the data management unit 4 may be provided within each input/output unit 2, or any other suitable unit. In addition, the data management unit 4 may be provided distributedly.

Each terminal 11 can be any device capable of issuing a request with respect to the multimedia server 10, and utilizing the multimedia data transferred from the multimedia server 10. Each terminal 11 may also issue data so that data stored in each terminal 11 can be accessed from the multimedia server 10 or other terminals 11.

FIG. 8 shows data flowing through the network 3 at various operation timings in the multimedia server 10 of FIG. 7, including a time of transferring the video data V from the multimedia data storage device 1-1 to the terminal 11-A (a part ($\alpha$) of FIG. 8) and a time of transferring the video data V to the terminal 11-B at slightly later timing, (a part ($\beta$) of FIG. 8).

When the terminal 11-A issues a request for the video data V to the input/output unit 2-A, the input/output unit 2-A inquires the data management unit 4 about a device storing the requested video data V. When it is ascertained that the video data V is stored in the multimedia data storage device 1-1, this video data V is transferred from the multimedia data storage device 1-1 to the input/output unit 2-A via the network 3. At a time of transferring the video data V from the multimedia data storage device 1-1 to the input/output unit 2-A, the buffer selection unit 21-A of the input/output unit 2-A stores this video data V transferred from the multimedia data storage device 1-1 into a vacant buffer 22 (assumed to be a buffer 22-A0 here) in the input/output unit 2-A.

Next, while the video data V is transferred to the buffer 22-A0, when another terminal 11-B issues a request for the same video data V to the input/output unit 2-B, the input/output unit 2-B inquires the data management unit 4 about a device storing the requested video data V. In this case, the video data V is stored in the multimedia data storage device 1-1 as well as in the buffer 22-A0 of the input/output unit 2-A, but it is assumed in this embodiment that the buffer 22-A0 is capable of accessing the stored data faster than the multimedia data storage device 1-1, so that the video data V is transferred from the buffer 22-A0 of the input/output unit 2-A to the input/output unit 2-B in this case. Then, the buffer selection unit 21-B stores this video data V transferred from the input/output unit 2-A into a vacant buffer 22 (assumed to be a buffer 22-B0 here) in the input/output unit 2-B.

At this point, the video data V as the data in response to the request of the input/output unit 2-A and the video data V as the data in response to the request of the input/output unit 2-B would be normally required to be flowing in the network 3 with some time difference, as indicated in a part ($\gamma$) of FIG. 8. Here, a transfer start time and a transfer end time of the video data V requested by the input/output unit 2-A are set to be t0 and t3, respectively, and a transfer start time and a transfer end time of the video data V requested by the input/output unit 2-B are set to be t1 and t4, respectively, a part of the video data V transferred to the input/output unit 2-A between a time t1 and a time t1 is set as V0, a remaining part of the video data V after the video data part V0 is set as V1, and a time required for transferring the video data part V0 starting from the time t1 is set to be t2.

Between the time t0 and the time t1, the data flowing in the network 3 is only the video data part V0 transferred to the input/output unit 2-A, but between the time t1 and the time t2, the video data part V1 transferred to the input/output unit 2-A and the video data part V0 transferred to the input/output unit 2-B are flowing in the network 3. During this period between the time t1 and the time t2, the input/output unit 2-B is receiving the video data part V0, but this input/output unit 2-B can easily predict that the video data part V1 which is also flowing in the network 3 for the sake of the input/output unit 2-A will be necessary later at this input/output unit 2-B as well, so that the input/output unit 2-B also takes the video data part V1 on the network 3 into a vacant buffer 22. In the input/output unit 2-B, the buffer 22-B0 is already used for taking the video data part V0, so that the buffer 22-B1 is used for taking the video data part V1. Then, after the video data part V0 stored in the buffer 22-B0 is transferred to the terminal 11-B, the video data part V1 stored in the buffer 22-B1 is transferred to the terminal 11-B in succession.

It would be normally necessary to transfer the video data V in response to the request of the input/output unit 2-B between the time t1 and the time t4 as indicated in a part (γ) of FIG. 8, but by utilizing the data flowing in the network as described above, it becomes possible to transfer the video data V in response to the request of the input/output unit 2-B within a shorter period of time between the time t1 and the time t3, as indicated in a part (δ) of FIG. 8.

In addition, there is no need to transfer the video data part V1 that would normally be required to be transferred between the time t2 and the time t4, so that the network 3 can be utilized efficiently. Moreover, it becomes possible to provide the data with a lesser number of accesses with respect to a plurality of requests issued with some time difference, so that it is possible to reduce a possibility for an occurrence of the bottleneck due to an increase of a number of accesses to the data.

FIG. 9 shows one modification of the third embodiment described above, in which the multimedia data storage devices 1-1 and 1-2 are directly connected to the input/output units 2-A and 2-B, respectively. The third embodiment as described above is equally valid for such a modified configuration with directly connected multimedia data storage devices 1 and the input/output units 2. Here, the multimedia data storage devices 1 may be directly connected with only some of the input/output units 2, and the multimedia server 10 may mixedly contain those multimedia data storage devices 1 which are directly connected with some input/output units 2 and those multimedia data storage devices 1 which are connected only with the network 3.

It is also possible to apply the modification of FIG. 4 described above to this third embodiment as well. In other words, the multimedia server of this third embodiment can be further connected with other server via a wide area network.

In this case, when a request for data K is issued from the terminal 11-A, for example, the input/output unit 2-A inquires the data management unit 4 as to whether the requested data K is stored in this multimedia server 10 or not, and if not, the input/output unit 2-A inquires the other server as to whether the requested data K is stored in that other server or not via a server connection unit. If the other server stores the requested data K, the requested data K is transferred from that other server to this input/output unit 2-A of the multimedia server 10. Here, the input/output unit 2-A may inquire the other server as to whether the data K is stored there via the server connection unit at the same time as it inquires the data management unit 4 of this multimedia server 10 as to whether the data K is stored there.

In the above case, the input/output unit 2 directly inquires the other server as to whether the requested data is stored there via the server connection unit, but there will be no need to inquire the other server about the requested data using the wide area network, if a data management unit for the other server is provided within this multimedia server 10 in addition. It may also be possible for the data management unit 4 of this multimedia server 10 to have the management information concerning the data stored in the other server as well.

Conversely, this multimedia server 10 can provide a service with respect to the other server when a request or an inquiry about the data is given from the other server via the wide area network and the server connection unit, just as in a case of a request from the terminal 11 connected to this multimedia server 10.

It is to be noted that, in the third embodiment described above, two buffers 22 are provided in correspondence to one terminal 11, but there is no need to allocate buffers 22 in this particular manner. In general, a number of buffers 22 in each input/output unit 2 may be different from a number of terminals connected to each input/output unit 2.

It is also to be noted that, in the third embodiment described above, the requested data is directly taken into the buffer 22 from the multimedia data storage device 1 which stores the requested data, but the requested data may be taken into the buffer 22 after it is once taken into some other memory device (capable of realizing accesses at least as fast as the multimedia data storage device 1) such as a cache memory from the multimedia data storage device 1. In this manner, the data associated with a high access frequency at a moment can be obtained at high speed.

Furthermore, when more than terminals exist, it is possible to transfer the data stored in one terminal to the other terminal or server, and it is possible for the other terminal or server to take out the data stored in one terminal. Even in this case, when the potentially necessary data exists in the network 3, the potentially necessary data can be pre-fetched and pre-stored into a vacant buffer.

Furthermore, instead of storing the necessary data after the necessary data is predicted, it is also possible to store any data flowing in the network 3 in a vacant buffer routinely.

Furthermore, the data for the terminals connected to the same input/output unit can be stored in the same buffer, or in different buffers.

Referring now to FIG. 10 to FIG. 18, the fourth embodiment of a multimedia server according to the present invention will be described in detail.

Figure 10:
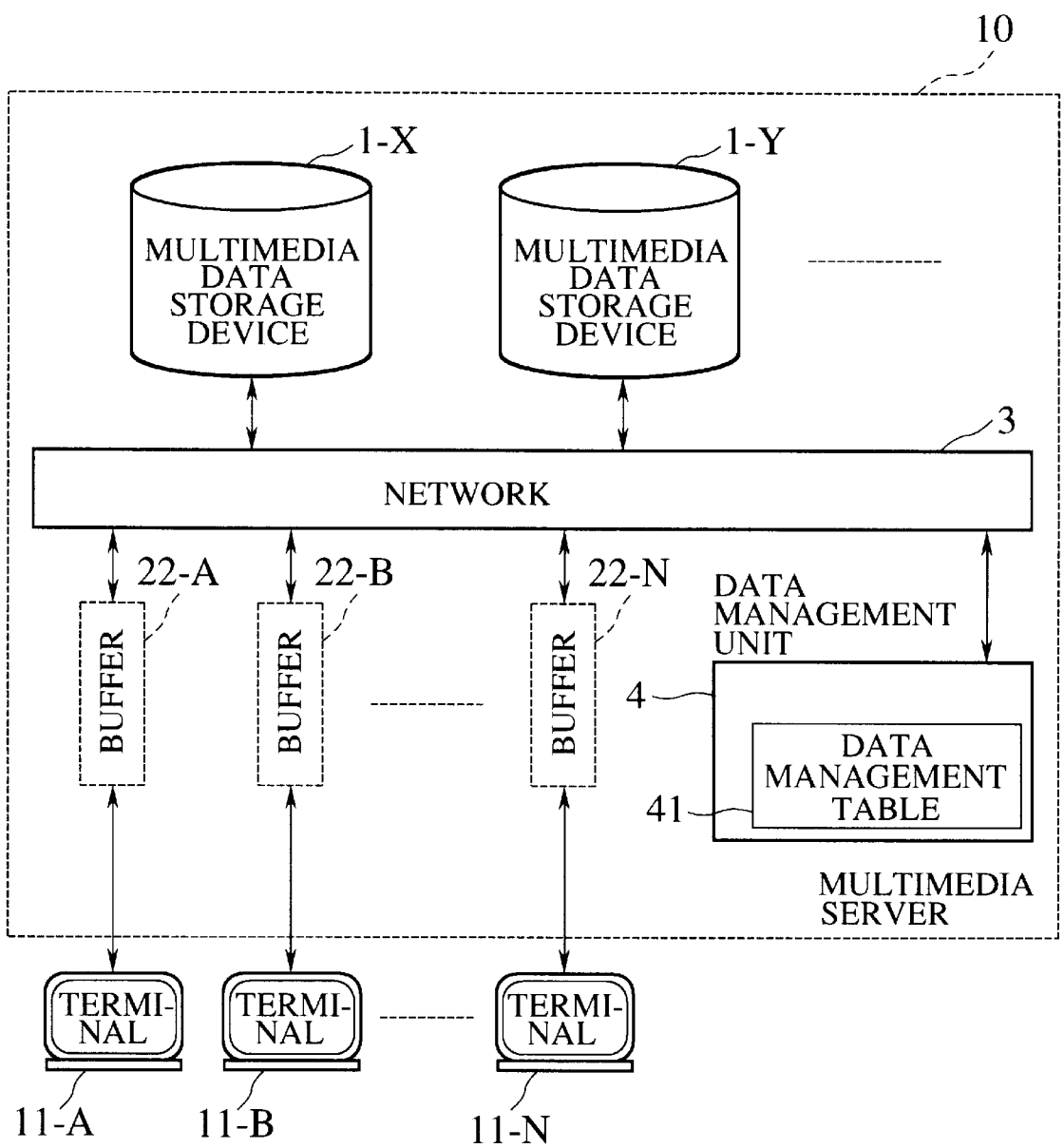
FIG. 10 is a block diagram of the fourth embodiment of a multimedia server according to the present invention.

FIG. 10 shows a configuration of a multimedia server 10 in the fourth embodiment, which comprises: a plurality of multimedia data storage devices 1 (1-X, 1-Y, and so on); a plurality of buffers 22 (22-A to 22-N); a data management unit 4 including a data management table 41; and a network 3 connecting these multimedia data storage devices 1, the buffers 22, and the data management unit 4 each other.

Each buffer 22 (22-A to 22-N) is also connected with a terminal 11 (11-A to 11-N) so that the multimedia data stored in the multimedia data storage device 1 can be transferred to each terminal 11 via a corresponding buffer 22, as each buffer 22 temporarily stores the multimedia to be transferred to a corresponding terminal 11. The buffers 22 are connected with the multimedia data storage devices 1 via the network 3 so that the multimedia data can be freely transferred between them.

The data management unit 4 has the data management table 41 for indicating a stored position of each data on the multimedia data storage devices 1 and data temporarily stored in each buffer 22. FIG. 11 shows an exemplary format of this data management table 41, where each entry for each data has a field for indicating a stored position of that data on the multimedia data storage devices 1 and a field for indicating a buffer which is storing that data, For the multimedia data storage devices 1, any memory devices capable of storing multimedia data such as magnetic disks, optical disks, opto-magnetic disks, silicon disks, or magnetic tapes, or devices capable of acquiring various types of data such as televisions, cameras, microphones, scanners, or sensors can be used. In general, the multimedia data storage device 1 is a low speed but a large capacity device, which has an access speed slower than that of the buffer 22.

When data J and K are stored in the multimedia data storage device 1-X while data L and M are stored in the multimedia data storage device 1-Y, the content of the data management table 41 appears as shown in FIG. 12, where it is assumed that none of these data J, K, L and M are stored in any buffer 22 at this point.

When the terminal 11-A issues a request for the data J stored in the multimedia data storage device 1-X to the multimedia server 10, the request issued by the terminal 11-A is given to the data management unit 4. At the data management unit 4, it can be judged that this data J is stored in the multimedia data storage device 1-X according to the data management table 41, so that the data management unit 4 transfers this data J from the multimedia data storage device 1-X to the buffer 22-A.

At this point, in order to register the fact that the data J is stored in the buffer 22-A, the buffer 22-A is registered in the buffer storing data field for this data J in the data management table 41, as shown in FIG. 13. Then, the buffer 22-A transfers the data J transferred from the multimedia data storage device 1-X to the terminal 11-A.

Next, when another terminal 11-B issues a request for the same data J to the multimedia server 10, the request issued by the terminal 11-B is given to the data management unit 4. At the data management unit 4, it can be judged that this data J is stored in the multimedia data storage device 1-X and the buffer 22-A according to the data management table 41.

In this case, the buffer 22-A can make an access to the stored data faster than the multimedia data storage device 1-X, so that the data management unit 4 transfers this data J from the buffer 22-A to the buffer 22-B. Note, however, that which one of the multimedia data storage device and the buffer can make a faster access to the data depends on a situation of the time, as in a case in which the multimedia data storage device and the buffer have the identical access speed, a case in which the multimedia data storage device can make a faster access because of the configuration of the network 3, a case in which the access speed of the buffer is slow as many data are taken out from the buffer at that point, etc. Consequently, it is preferable to determine one of the multimedia data storage device and the buffer to take out the data according to the situation of the time.

Then, the data management unit 4 registers the fact that the data J is stored in the buffer 22-B in the data management table 41 as shown in FIG. 14, and the buffer 22-B transfers the data J transferred from the buffer 22-A to the terminal 11-B.

Next, while the data management table 41 is in a state shown in FIG. 14, when the terminal 11-A issues a request for another data K to the multimedia server 10, the request issued by the terminal 11-A is given to the data management unit 4. At the data management unit 4, it can be judged that this data K is stored only in the multimedia data storage device 1-X according to the data management table 41, so that the data management unit 4 transfers this data K from the multimedia data storage device 1-X to the buffer 22-A.

At this point, the data management table 41 has the buffer 22-A registered as the buffer storing the data J, so that the buffer 22-A is deleted from the buffer storing the data J and newly registered as the buffer storing this data K in the data management table 41 as shown in FIG. 15. Then, the buffer 22-A transfers the data K transferred from the multimedia data storage device 1-X to the terminal 11-A.

As described, in the multimedia server 10 of this fourth embodiment, the data storing state of each buffer is managed by the data management table 41, and the data can be transferred to a buffer corresponding to the terminal which issued the request from another buffer at high speed. In addition, within a range of the buffer capacity, it is also possible for this fourth embodiment to deal with the operations such as the fast forward or reverse playback mode operations at high speed.

It is to be noted that, in the fourth embodiment described above, one buffer 22 is provided in correspondence to one terminal 11, but there is no need to allocate buffers 22 in this particular manner, and it is possible to connect one buffer 22 to a plurality of terminals 11. Also, each buffer 22 can be logically divided into plural sections, so that one buffer 22 can transfer data to the terminal 11 while receiving data transferred from another buffer 22.

Figure 16:
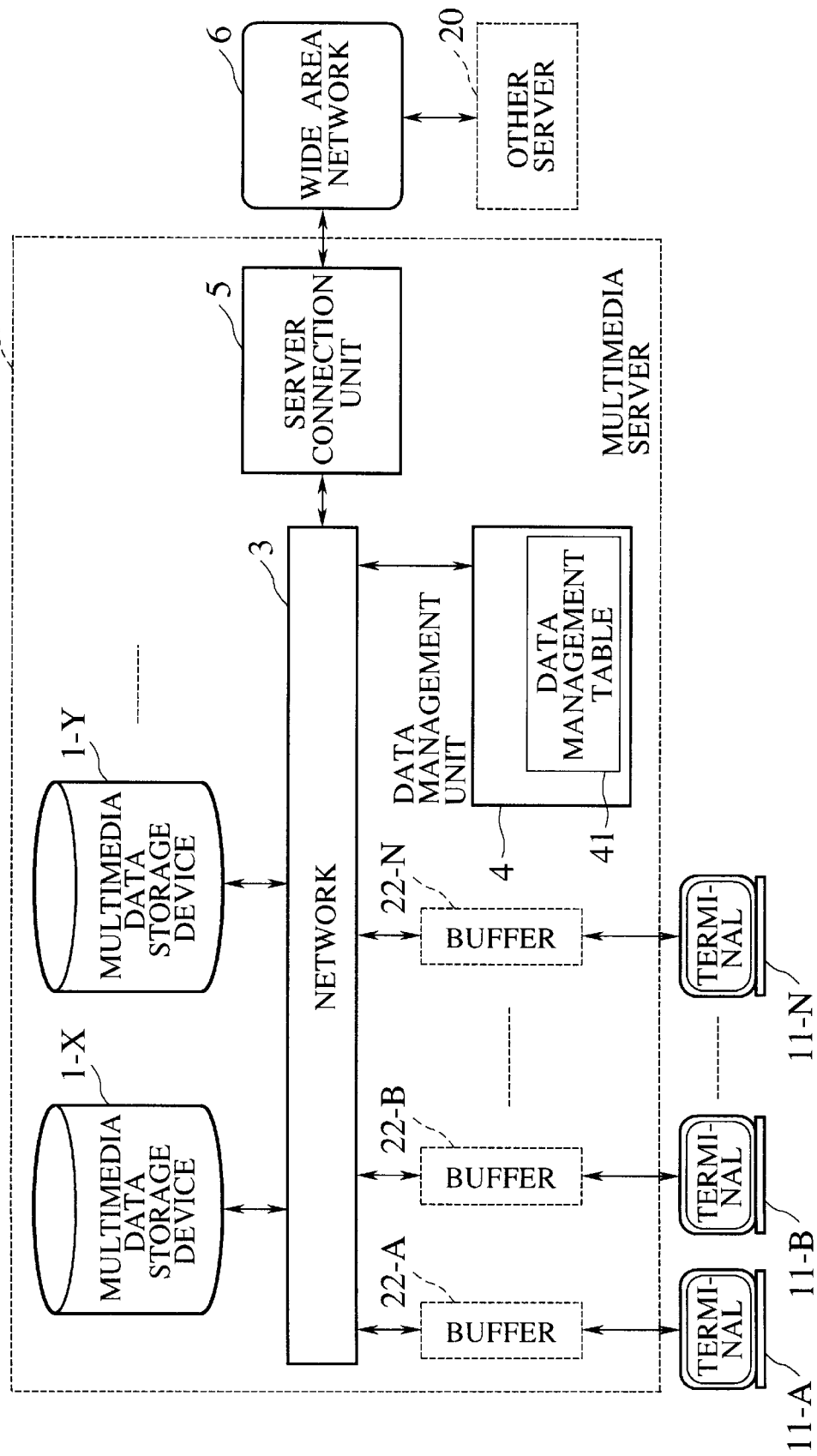
FIG. 16 is a block diagram of one modification of the multimedia server of FIG. 10.

FIG. 16 shows one modification of the fourth embodiment described above, in which the multimedia server 10 of FIG. 10 is further connected with other server 20 via a wide area network 6.

In this case, when a request for data N not stored in the multimedia server 10 is issued from the terminal 11-A, for example, the request issued by the terminal 11-A is given to the data management unit 4. At the data management unit 4, it can be judged that this data N is stored in the other server 20 according to the data management table 41 as shown in FIG. 17, so that the data management unit 4 issues a request for the data N to the other server 20 connected by the wide area network 6, via the server connection unit 5. The data N transferred from the other server 20 is then transferred to the buffer 22-A via the server connection unit 5. At this point, the buffer 22-A is registered as the buffer storing this data N in the data management table 41 as shown in FIG. 18.

It is to be noted that, in the modification of FIG. 16, when the data N not stored in the multimedia server 10 is issued from the terminal 11-A, the data management unit 4 searched for a stored position of the data N using the data management table 41 provided therein. However, in order to deal with a case in which the data management table 41 cannot register the data stored in the other server 20, it is also possible to provide a function to inquire the data management unit of the other server 20 about a presence/absence of the data N there via the wide area network 6, for data which is not registered in the data management table 41 on this multimedia server 10. In this case, the other server 20 to be inquired may be limited to specific servers, or not limited to any specific servers. As a result of the inquiry, when it is ascertained that the data N is stored in the other server 20, the data N is transferred from that other server 20 to the buffer 22-A via the wide area network 6 and the server connection unit 5.

At this point, the data management unit 4 may or may not create a new entry for the data N in the data management table 41. In a case of creating a new entry for the data N, the data N can be taken out without reaching to the other server 20 as long as there is a buffer which stores this data N within this multimedia server 10. However, in order to account for a case of changing the data N, it is preferable to provide a function to notify the change of the data N to the other server 20 which originally stored the data N, as well as a function to invalidate or update the data N within the multimedia server 10 upon receiving a notice for the change of the data N at the data management unit 4. In this manner, the validity of the data N can be guaranteed. Moreover, rather than just transferring the data N to the buffer, the data N can also be stored into the multimedia data storage device 1 as well.

It is also to be noted that, in the fourth embodiment described above, the requested data is directly taken into the buffer 22 from the multimedia data storage device 1 which stores the requested data, but the requested data may be taken into the buffer 22 after it is once taken into some other memory device such as a cache memory from the multimedia data storage device 1.

It is also to be noted that there can be a case in which the data is larger than a capacity of the buffer 22, so that it is preferable for the data management table 41 to store an address of the data (by which which part of the data is stored there can be identified) in addition to the buffer storing the data.

It is also to be noted that, in a state of transferring the data J stored in the multimedia data storage device 1-X to the buffer 22-A, when a size of the data J exceeds the capacity of the buffer 22-A, or when the data J is transferred from the buffer 22-A to the buffer 22-B while this data J is transferred to the buffer 22-A (i.e., when a part of the data J that has transferred to the buffer 22-A is transferred to the buffer 22-B), there is a case in which the buffer 22-A has a need to discard the data J before the transfer of the data J from the buffer 22-A to the buffer 22-B is completed as the buffer 22-A obtains the data J ahead of the buffer 22-B.

There is also a case where the terminal 11-B can take out the data from the buffer 22-B faster than the terminal 11-A can take out the data from the buffer 22-A or a case in which the buffer 22-B needs a part of the data J different from that stored in the buffer 22-A due to a connection malfunction or an overloading state at a connection between the buffer 22-A and the terminal 11-A. There is also a similar situation arising when the data J is the video or speech data and the terminal carries out the operations such as the pause, fast forward, or reverse playback mode operations.

In these cases, the source of obtaining the data J at the buffer 22-B is changed from the buffer 22-A to the multimedia data storage device 1-X. The source of obtaining the data J at the buffer 22-A is the multimedia data storage device 1-X from the beginning, but if it is possible to transfer this data J from the other buffer 22, the source of obtaining the data J at the buffer 22-A can be changed to that other buffer 22. In this manner, it is preferable for the data management unit 4 to monitor a state (information on malfunction, etc.) of each buffer, and change the source of obtaining the data dynamically when the data transfer between buffers 22 becomes difficult as described above.

It is also to be noted that, in the fourth embodiment described above, the data transfer is controlled by only one data management unit 4, but it may also be possible to control the data transfer by distributing the function of the data management unit 4 over buffers 22 and the multimedia data storage devices 1.

Figure 20:
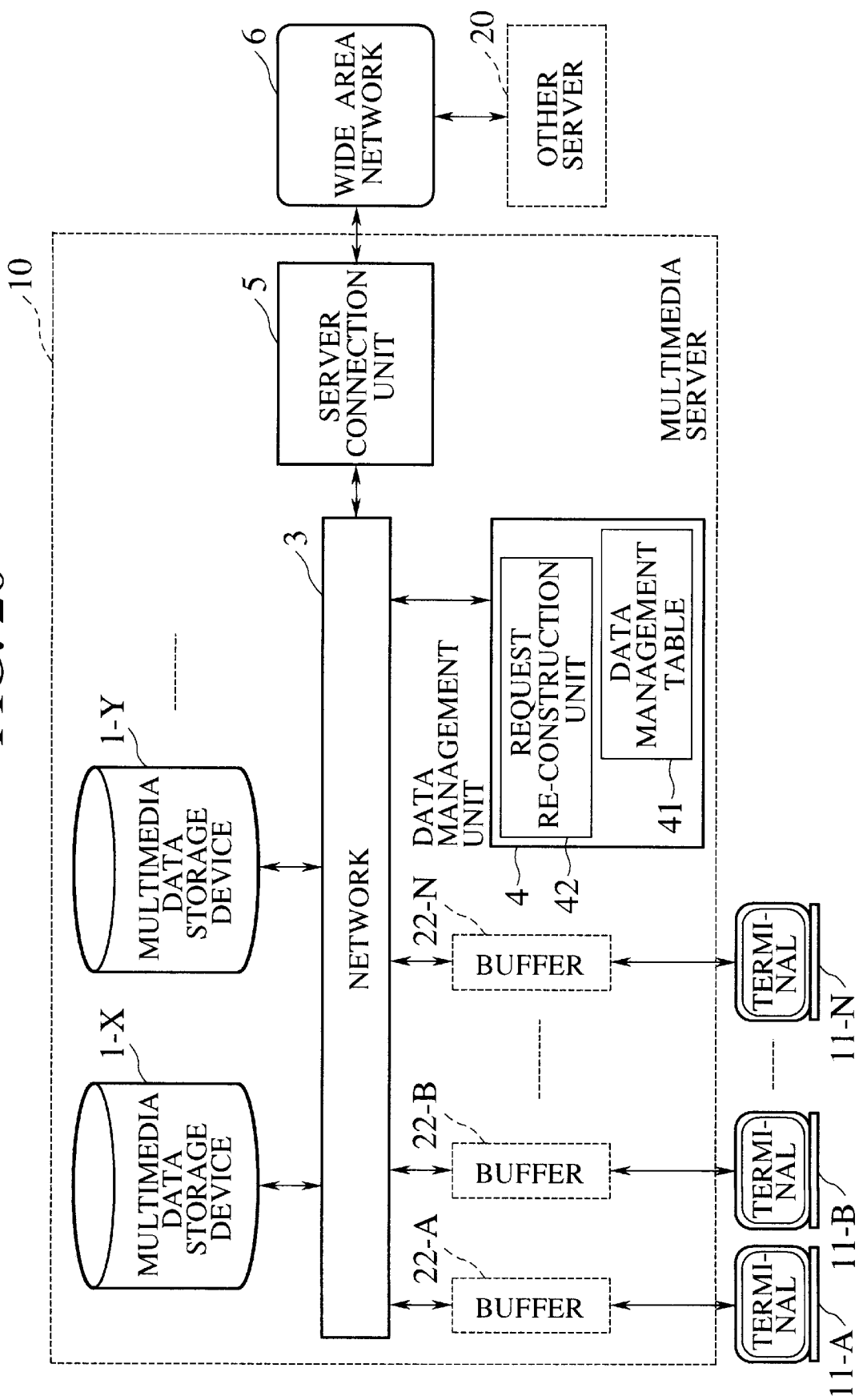
FIG. 20 is a block diagram of one modification of the multimedia server of FIG. 19.

Referring now to FIG. 19 and FIG. 20, the fifth embodiment of a multimedia server according to the present invention will be described in detail.

FIG. 19 shows a configuration of a multimedia server 10 in the fifth embodiment, which comprises: a plurality of multimedia data storage devices 1 (1-X, 1-Y, and so on); a plurality of buffers 22 (22-A to 22-N); a data management unit 4 including a data management table 41 and a request re-construction unit 42; and a network 3 connecting these multimedia data storage devices 1, the buffers 22, and the data management unit 4 each other.

Each buffer 22 (22-A to 22-N) is also connected with a terminal 11 (11-A to 11-N) so that the multimedia data stored in the multimedia data storage device 1 can be transferred to each terminal 11 via a corresponding buffer 22, as each buffer 22 temporarily stores the multimedia to be transferred to a corresponding terminal 11. The buffers 22 are connected with the multimedia data storage devices 1 via the network 3 so that the multimedia data can be freely transferred between them.

The data management unit 4 has the data management table 41 for indicating a stored position of each data on the multimedia data storage devices 1 and data temporarily stored in each buffer 22, and the request re-construction unit 42 for temporarily storing requests sent from the buffers 22, and combining requests for the same data into a single unified request.

For the multimedia data storage devices 1, any memory devices capable of storing multimedia data such as magnetic disks, optical disks, opto-magnetic disks, silicon disks, or magnetic tapes, or devices capable of acquiring various types of data such as televisions, cameras, microphones, scanners, or sensors can be used. In general, the multimedia data storage device 1 is a low speed but a large capacity device, which has an access speed slower than that of the buffer 22.

When requests for the same data J are issued from the terminals 11-A and 11-B almost simultaneously, i.e., within a prescribed period of time, the buffers 22-A and 22-B connected with these terminals 11-A and 11-B send access requests with respect to the data J to the data management unit 4. Here the request re-construction unit 42 of the data management unit 4 has a function to combine the requests for the same data received within each unit time period, so that the requests sent from the buffers 22-A and 22-B are combined into a single unified request as they are for requests for the same data received within the same unit time period. The unit time period is determined as a time period which does not affect the response time with respect to the request very much.

At the data management unit 4, it can be judged that the data J requested by this single unified request is stored in the multimedia data storage device 1-X according to the data management table 41, so that the data J is transferred from the multimedia data storage device 1-X to both of the buffers 22-A and 22-B simultaneously, by means of a single access. At this point, the buffers 22-A and 22-B are registered as the buffers storing this data J in the data management table 41 as shown in FIG. 14 described above.

It is to be noted that, in the fifth embodiment described above, one buffer 22 is provided in correspondence to one terminal 11, but there is no need to allocate buffers 22 in this particular manner, and it is possible to connect one buffer 22 to a plurality of terminals 11. In the latter case, the request reconstruction unit 42 may be provided in each buffer 22, either in addition to the request re-construction unit 42 of the data management unit 4, or as a replacement to the request re-construction unit 42 of the data management unit 4.

FIG. 20 shows one modification of the fifth embodiment described above, in which the multimedia server 10 of FIG. 19 is further connected with other server 20 via a wide area network 6, similarly as in the modification of FIG. 16 in the fourth embodiment described above.

In this case, when a request for data N not stored in the multimedia server 10 is issued from the terminal 11-A, for example, the request issued by the terminal 11-A is given to the data management unit 4, and combined with the other requests for this data N received within the unit time period into a single unified request at the request re-construction unit 42. At the data management unit 4, it can be judged that this data N is stored in the other server 20 according to the data management table 41 as shown in FIG. 17 described above, so that the data management unit 4 issues a request for the data N to the other server 20 connected by the wide area network 6, via the server connection unit 5. The data N transferred from the other server 20 is then transferred to all the buffers 22 which requested this data N including the buffer 22-A via the server connection unit 5. At this point, all the buffers which requested this data N including the buffer 22-A are registered as the buffers storing this data N in the data management table 41.

It is to be noted that, in the modification of FIG. 20, when the data N not stored in the multimedia server 10 is issued from the terminal 11-A, the data management unit 4 searched for a stored position of the data N using the data management table 41 provided therein. However, in order to deal with a case in which the data management table 41 cannot register the data stored in the other server 20, it is also possible to provide a function to inquire the data management unit of the other server 20 about a presence/absence of the data N there via the wide area network 6, for data which is not registered in the data management table 41 on this multimedia server 10. In this case, the other server 20 to be inquired may be limited to specific servers, or not limited to any specific servers. As a result of the inquiry, when it is ascertained that the data N is stored in the other server 20, the data N is transferred from that other server 20 to all the buffers 22 which requested this data N including the buffer 22-A via the wide area network 6 and the server connection unit 5.

At this point, the data management unit 4 may or may not create a new entry for the data N in the data management table 41. In a case of creating a new entry for the data N, the data N can be taken out without reaching to the other server 20 as long as there is a buffer which stores this data N within this multimedia server 10. However, in order to account for a case of changing the data N, it is preferable to provide a function to notify the change of the data N to the other server 20 which originally stored the data N, as well as a function to invalidate or update the data N within the multimedia server 10 upon receiving a notice for the change of the data N at the data management unit 4. In this manner, the validity of the data N can be guaranteed. Moreover, rather than just transferring the data N to the buffer, the data N can also be stored into the multimedia data storage device 1 as well.

It is also to be noted that, in the fifth embodiment described above, the requested data is directly taken into the buffer 22 from the multimedia data storage device 1 which stores the requested data, but the requested data may be taken into the buffer 22 after it is once taken into some other memory device such as a cache memory from the multimedia data storage device 1.

It is also to be noted that there can be a case in which the data is larger than a capacity of the buffer 22, so that it is preferable for the data management table 41 to store an address of the data (by which which part of the data is stored there can be identified) in addition to the buffer storing the data.

It is also to be noted that, in the fifth embodiment described above, the data transfer is controlled by only one data management unit 4, but it may also be possible to control the data transfer by distributing the function of the data management unit 4 over buffers 22 and the multimedia data storage devices 1.

Figure 21:
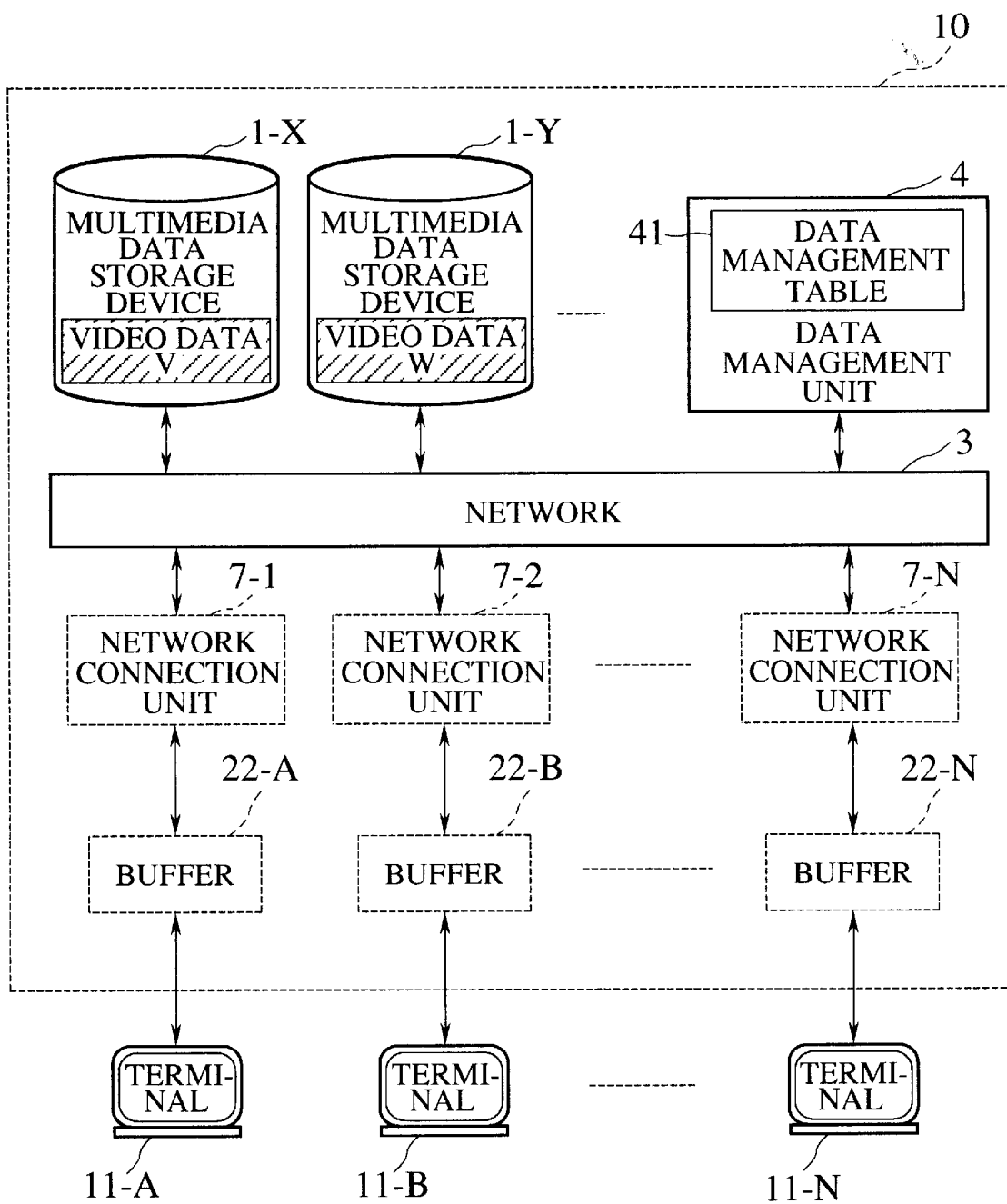
FIG. 21 is a block diagram of the sixth embodiment of a multimedia server according to the present invention.
Figure 22:
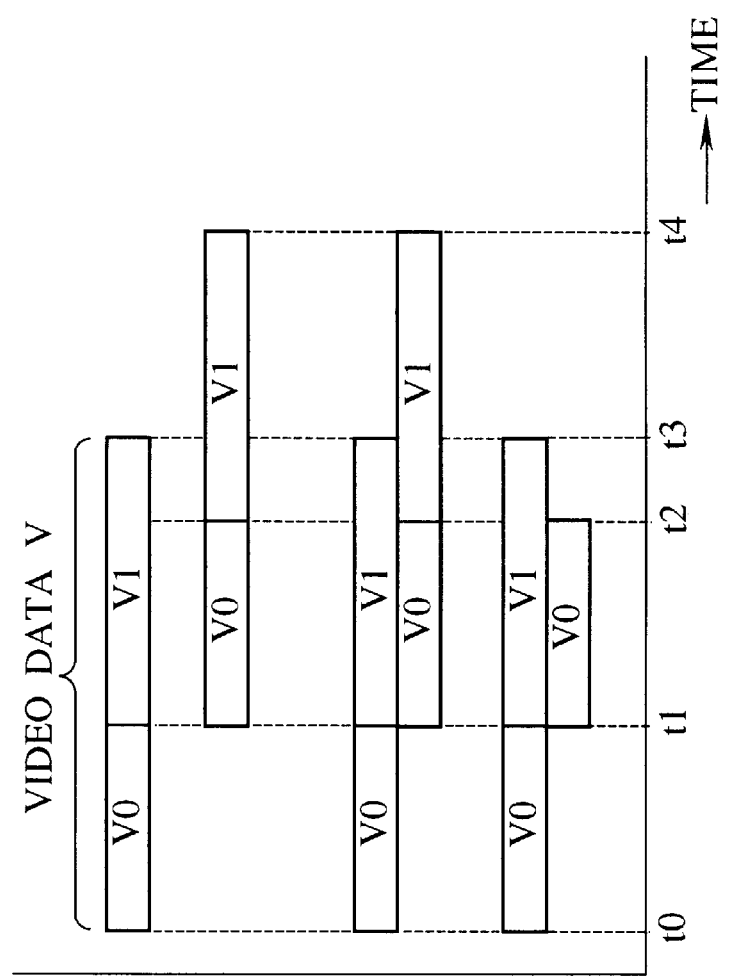
FIG. 22 is a timing chart for data flowing in the network of this multimedia server of FIG. 21.

Referring now to FIG. 21 and FIG. 22, the sixth embodiment of a multimedia server according to the present invention will be described in detail.

FIG. 21 shows a configuration of a multimedia server 10 in the sixth embodiment, which comprises: a plurality of multimedia data storage devices 1 (1-X, 1-Y, and so on); a plurality of buffers 22 (22-A to 22-N) connected with a plurality of network connection units 7 (7-1 to 7-N); a data management unit 4 including a data management table 41; and a network 3 connecting these multimedia data storage devices 1, the network connection units 7, and the data management unit 4 each other.

Each buffer 22 (22-A to 22-N) is also connected with a terminal 11 (11-A to 11-N) so that the multimedia data stored in the multimedia data storage device 1 can be transferred to each terminal 11 via a corresponding buffer 22, as each buffer 22 temporarily stores the multimedia to be transferred to a corresponding terminal 11.

Each network connection unit 7 has a function for predicting data necessary in future at the corresponding buffer 22, pre-fetching the predicted future necessary data from the data flowing in the network 3, and storing the pre-fetched future necessary data into the corresponding buffer 22.

The network 3 is multiplexed (assumed to be doubled in the following) by a multiplexing scheme such as a frequency division multiple access scheme, for example, so that a plurality of multimedia data can be transferred simultaneously to arbitrary buffers 22.

The data management unit 4 has the data management table 41 for indicating a stored position of each data on the multimedia data storage devices 1 and data temporarily stored in each buffer 22.

For the multimedia data storage devices 1, any memory devices capable of storing multimedia data such as magnetic disks, optical disks, opto-magnetic disks, silicon disks, or magnetic tapes, or devices capable of acquiring various types of data such as televisions, cameras, microphones, scanners, or sensors can be used. In general, the multimedia data storage device 1 is a low speed but a large capacity device, which has an access speed slower than that of the buffer 22.

FIG. 22 shows data flowing through the network 3 at various operation timings in the multimedia server 10 of FIG. 21, including a time of transferring the video data V from the multimedia data storage device 1-X to the terminal 11-A (a part (α) of FIG. 22) and a time of transferring the video data V to the terminal 11-B at slightly later timing, (a part (β) of FIG. 22).

When the terminal 11-A issues a request for the transfer of the video data V, the data management unit 4 can judge that this video data V is stored in the multimedia data storage device 1-X, so that this video data V is transferred from the multimedia data storage device 1-X to the network connection unit 7-1 via the network 3 and then from the network connection unit 7-1 to the terminal 11-A via the buffer 22-A.

Next, while the video data V is transferred to the buffer 22-A, when another terminal 11-B issues a request for the same video data V, the data management unit 4 can judge that this video data V is stored in the multimedia data storage device 1-X, so that this video data V is transferred from the multimedia data storage device 1-X to the network connection unit 7-2 via the network 3 and then from the network connection unit 7-2 to the terminal 11-B via the buffer 22-B.

At this point, the video data V as the data in response to the request of the terminal 11-A and the video data V as the data in response to the request of the terminal 11-B would normally be required to be flowing in the network 3, as indicated in a part (γ) of FIG. 22. Here, a transfer start time and a transfer end time of the video data V requested by the terminal 11-A are set to be t0 and t3, respectively, and a transfer start time and a transfer end time of the video data V requested by the terminal 11-B are set to be t1 and t4, respectively, a part of the video data V transferred to the terminal 11-A between a time t0 and a time t1 is set as V0, a remaining part of the video data V after the video data part V0 is set as V1, and a time required for transferring the video data part V0 starting from the time t1 is set to be t2.

Between the time t0 and the time t1, the data flowing in the network 3 is only the video data part V0 transferred to the terminal 11-A, but between the time t1 and the time t2, the video data part V1 transferred to the terminal 11-A and the video data part V0 transferred to the terminal 11-B are flowing in the network 3. At the time t1, the video data part V1 in response to the request of the terminal 11-A and the video data part V0 in response to the request of the terminal 11-B are entered into the network 3.

The network connection units 7-1 and 7-2 are monitoring data (video data part V0 and video data part V1) flowing in the network 3, and recognizing the fact that the buffer 22-B is requesting the video data V, so that it can easily be predicted that the video data part V1 which is also flowing in the network 3 for the sake of the terminal 11-A will be necessary later at the buffer 22-B in addition to the video data part V0 which is flowing in the network 3 for the sake of the terminal 11-B, so that the network connection unit 7-2 also takes the video data part V1 on the network 3 into a vacant area in the buffer 22-B.

It would be normally necessary to transfer the video data V in response to the request of the terminal 11-B between the time t1 and the time t4 as indicated in a part (γ) of FIG. 22, but by utilizing the data flowing in the network as described above, it becomes possible to transfer the video data V in response to the request of the terminal 11-B within a shorter period of time between the time t1 and the time t3, as indicated in a part (δ) of FIG. 22.

In addition, there is no need to transfer the video data part V1 that would normally be required to be transferred between the time t2 and the time t4, so that the network 3 can be utilized efficiently.

Moreover, it becomes possible to provide the data with a lesser number of accesses with respect to a plurality of requests issued with some time difference, so that it is possible to reduce a possibility for an occurrence of the bottleneck due to an increase of a number of accesses to the data.

It is to be noted that, in the sixth embodiment described above, one network connection unit 7 is provided in correspondence to one buffer 22, and one buffer 22 is provided in correspondence to one terminal 11, but it is also possible to connect a plurality of buffers 22 to one network connection unit 7, and it is also possible to connect one buffer 22 to a plurality of terminals 11.

Moreover, the network connection unit 7 may transfer the data pre-fetched according to the prediction to the buffer 22 other than that to which the data is currently transferred.

It is also to be noted that the data that can be predicted and pre-fetched by the network connection unit 7 is not necessarily limited to the data transferred from the multimedia data storage device 1, and can be the data transferred between the buffers 22 via the network 3 as described above, or the data transferred from the other server in a case where this multimedia server 10 is connected with the other server.

Note that, in the sixth embodiment described above, a case of handling the video data has been described, but this sixth embodiment is equally applicable to various other types of data such as still image data, text data, etc.

Also, in the sixth embodiment described above, the network is multiplexed and the data are collectively handled, but this sixth embodiment is also valid even when the network is time division multiplexed and the data are given in prescribed units of division, as long as it is possible to predict the future necessary data.

Figure 23:
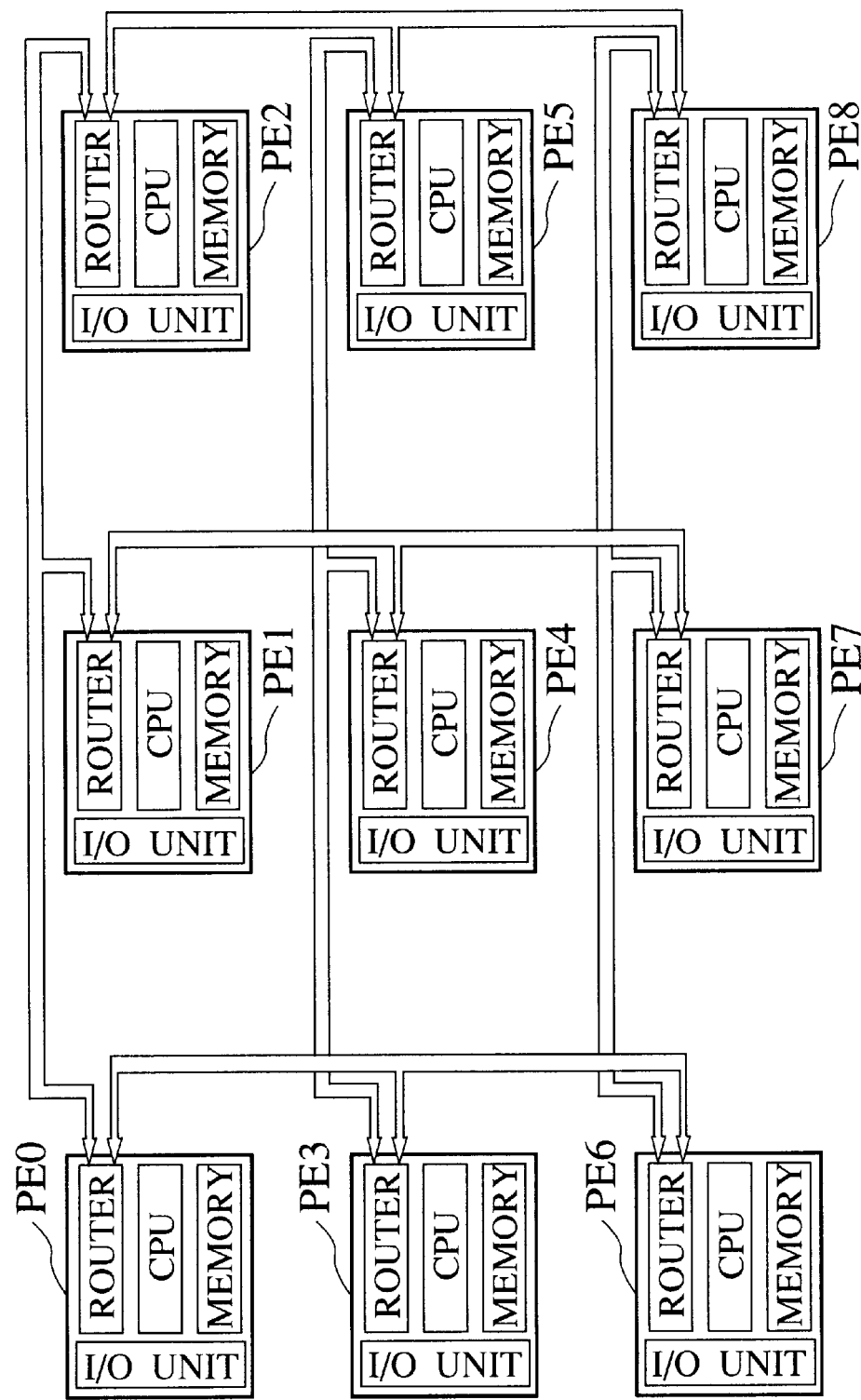
FIG. 23 is a block diagram of parallel processors to be used in the seventh embodiment of a multimedia server according to he present invention.
Figure 24:
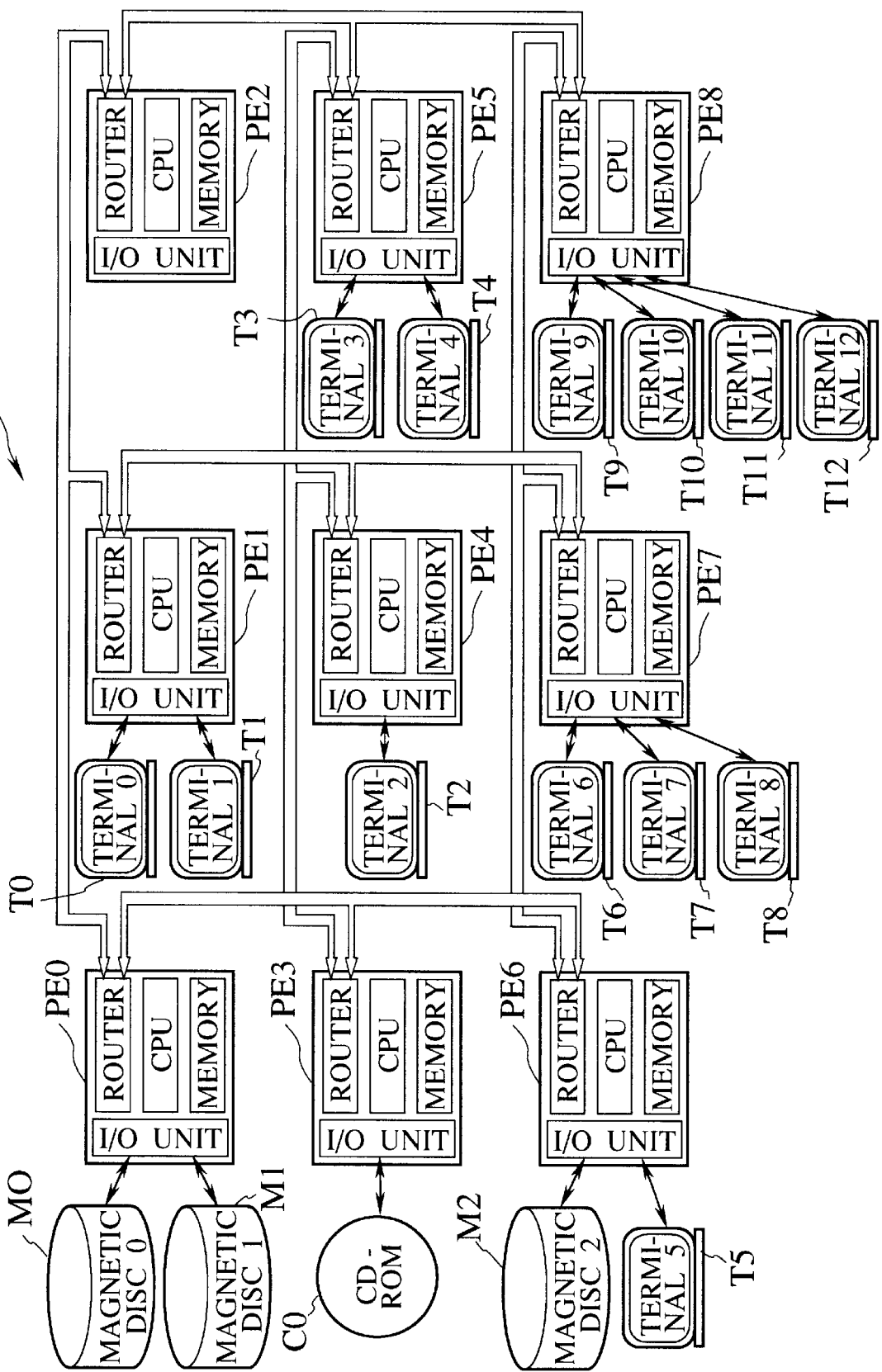
FIG. 24 is a block diagram of the seventh embodiment of a multimedia server according to the present invention.
Figure 25:
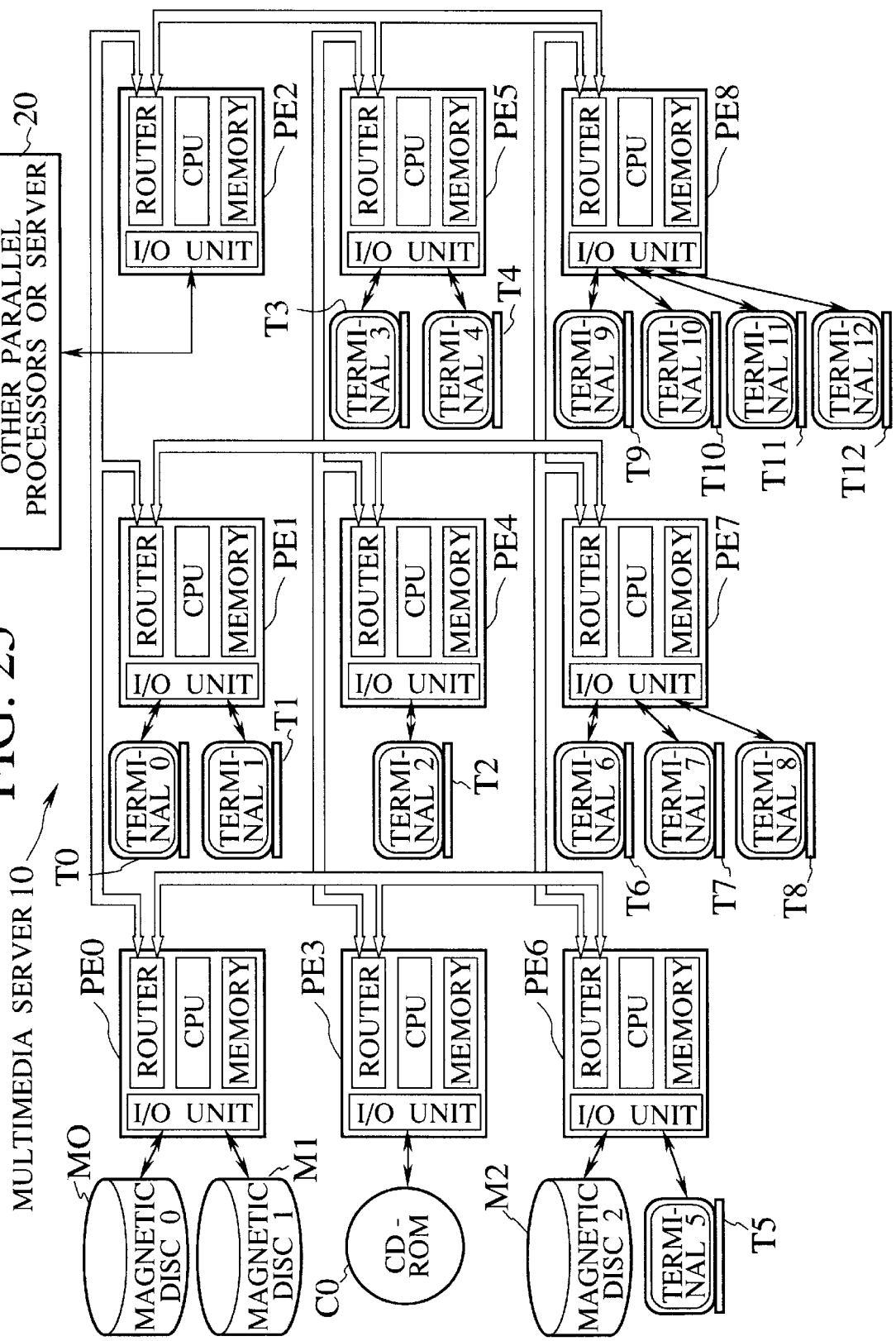
FIG. 25 is a block diagram of one modification of the multimedia server of FIG. 24.

Referring now to FIG. 23 to FIG. 25, the seventh embodiment of a multimedia server according to the present invention will be described in detail.

This seventh embodiment is directed to a case of the multimedia server using parallel processors.

FIG. 23 shows a configuration of parallel processors to be used in this seventh embodiment, which contain nine processing elements PE0 to PE8 mutually connected by 3×3 two dimensional torus connection network. Each processing element comprises a CPU, a memory, a router for making communications with the other processing elements, and an input/output (I/O) unit for connecting each processing element with external devices. Note here that the configuration of FIG. 23 is only an example, and any other settings for a connection among the processing elements and a number of processing elements may be used if desired.

FIG. 24 shows a multimedia server 10 formed by utilizing the parallel processors of FIG. 23.

In this multimedia server 10 of FIG. 24, the multimedia data storage devices or the terminals similar to those of the above described embodiments are connected to the input/output units of the processing elements PE0 to PE8.

More specifically, in this multimedia server 10 of FIG. 24, the processing element PE0 is connected with two magnetic disks M0 and M1, the processing element PE1 is connected with two terminals T0 and T1, the processing elements PE2 is connected with no external device, the processing element PE3 is connected with one CD-ROM device C0, the processing element PE4 is connected with one terminal T2, the processing element PE5 is connected with two terminals T3 and T4, the processing element PE6 is connected with one magnetic disk M2 and one terminal T5, the processing element PE7 is connected with three terminals T6, T7 and T8, and the processing element PE8 is connected with four terminals T9, T10, T11 and T12.

As can be seen in FIG. 24, there is no need for the processing elements PE0 to PE8 to be connected with the multimedia data storage devices or the terminals uniformly, and it is also possible to connect the multimedia data storage device and the terminal to the same processing element. In this multimedia server 10 of FIG. 24, the processing element PE2 which is connected with no external device will function as the data management unit of the above described embodiments.

In the following, for the sake of simplicity, it is assumed that the video data V is stored only in the magnetic disk M0 in an initial state, and this video data V is assumed to have a size that can be stored entirely within a memory of each processing element.

When the terminal T0 issues a request for the video data V stored in the magnetic disk M0, the processing element PE1 connected with this terminal T0 inquires the processing element PE2 (data management unit) about a stored position of the video data V. In response, the processing element PE2 informs the magnetic disk M0 of the processing element PE0 as the stored position of the video data V to the processing element PE1.

As a result, the processing element PE1 can learn that the video data V is stored in the magnetic disk M0, so that the video data V is copied from the magnetic disk M0 of the processing element PE0 to the memory of the processing element PE1. At this point, the processing element PE1 notifies the processing element PE2 (data management unit) that it has a copy of the video data V in its memory, and the processing element PE2 registers the memory of the processing element PE0 as a stored position of the video data V.

The video data V stored in the memory of the processing element PE1 in this manner is then transferred to the terminal T0 via the input/output unit of the processing element PE1.

Next, while the video data V is stored in the memory of the processing element PE1, when another terminal T2 connected with the processing element PE4 issues a request for the same video data, the processing element PE4 connected with this terminal T2 inquires the processing element PE2 (data management unit) about a stored position of the video data V.

At this point, the processing element PE2 recognizes that the video data V is stored in the magnetic disk M0 of the processing element PE0 and the memory of the processing element PE1, that the memory can make a faster access than the magnetic disk, and that the processing element PE1 is located closer to the processing element PE4 than the processing element PE0, so that the processing element PE2 informs the memory of the processing element PE0 as the stored position of the video data V to the processing element PE4.

As a result, the processing element PE4 can learn that the video data V is stored in the memory of the processing element PE1, so that the video data V is copied from the memory of the processing element PE1 to the memory of the processing element PE4.

At this point, the processing element PE4 notifies the processing element PE2 (data management unit) that it has a copy of the video data V in its memory, and the processing element PE2 registers the memory of the processing element PE4 as a stored position of the video data V.

The video data V stored in the memory of the processing element PE4 in this manner is then transferred to the terminal T2 via the input/output unit of the processing element PE4.

At a time of deleting the copy of the video data V from the memory, each of the processing element PE1 and the processing element PE4 notifies this fact to the processing element PE2 (data management unit).

Note that, in the above description, the seventh embodiment has been described for a case of handling the data on a magnetic disk, but an access to the CD-ROM device or any other type of the multimedia data storage device can also be made similarly.

Note also that the seventh embodiment described above is not only applicable to the video data but also to any multimedia data such as text data.

It is also possible to modify the multimedia server of this seventh embodiment as shown in FIG. 25, where the multimedia server 10 of FIG. 24 is further connected with other parallel processors or server 20 to form a server system in a larger scale.

It is to be noted that the data stored in the multimedia data storage device such as the magnetic disk may be copied into the memory of the processing element in advance.

It is also to be noted that the data obtained from the multimedia data storage device may be processed at the CPU of the processing element before the transfer to the terminal.

It is also to be noted here that, although a case of realizing the multimedia server equivalent to that of the first embodiment described has been described in detail here, it is equally possible for this seventh embodiment to implement the multimedia server of any other embodiment described above, by properly assigning functions of various units involved in each embodiment to the processing elements of FIG. 23 similarly as in a case of FIG. 24 described above.

For instance, it is possible to implement the third or sixth embodiment described above by properly assigning functions of the input/output units, a function for predicting the future necessary multimedia data, and a function for pre-fetching the predicted future necessary multimedia data to the processing elements of FIG. 23.

Similarly, it is possible to implement the fifth embodiment described above by properly assigning functions of the input/output units and a function for reconstructing a number of requests for the same multimedia data into a single unified request to the processing elements of FIG. 23.

As described, according to the present invention, the multimedia data read out from the multimedia data storage device is usually taken into the buffer of the input/output unit, but when the desired multimedia data is stored in the buffer of the other input/output unit, the desired multimedia data is taken from that buffer of the other input/output unit. Consequently, it is possible to reduce a number of accesses with respect to the multimedia data storage device that could otherwise be the bottleneck of the multimedia server.

In addition, a probability for the desired multimedia data to exist in the buffer of the other input/output unit increases as much as a level of concentration of the requests from a plurality of terminals becomes high, so that a probability for being able to obtain the necessary data from the nearby input/output unit immediately also increases in such a case.

Therefore, even when many requests are concentrated on the identical data, accesses will not be concentrated on a single multimedia data storage device, so that it is highly unlikely for this multimedia server to have the bottleneck at the multimedia data storage device.

In addition, the same data are sporadically stored at scattered positions, so that it is possible to obtain the desired multimedia data from nearby position, and therefore a load on the network within the multimedia server can also be reduced. Moreover, the desired multimedia data is obtained from the buffer with a high access speed whenever possible, so that a response time with respect to the terminal can also be shortened.

Furthermore, by providing means for switching the source for obtaining the multimedia data in a case of obtaining the multimedia data not available at the original source for obtaining the multimedia data, it becomes possible to prevent the failure of the data supply depending on a state of the data supplying side, even when there is a difference in the data processing powers between the data supplying side and the data supplied side.

Moreover, by providing means for predicting the multimedia data necessary in future, and means for monitoring the data flowing through the bus or network, it becomes possible to pre-fetch the future necessary data flowing in the bus or network, and a number of accesses to obtain the necessary data can be reduced, so that the bottleneck of the multimedia server regarding the data accesses can be avoided, and the load on the network can be reduced.

In addition, by combining a plurality of requests for the same data issued by a plurality of terminals consecutively within a prescribed period of time into a single unified request, and taking the requested multimedia data into a plurality of buffers simultaneously by means of a single access to the multimedia data storage device, it becomes possible to prevent an occurrence of consecutive accesses with respect to the particular multimedia data storage device even when the requests to the same data are issued consecutively from different terminals.

Thus, according to the present invention, it is possible to avoid an occurrence of the bottleneck in the accesses with respect to the memory devices even when many accesses occur in the multimedia server, and it is possible to reduce a load on the network, so that it becomes possible to realize a large scale multimedia server.

It is to be noted that the processing with respect to a plurality of input/output units in each embodiment described above is equally applicable to a plurality of buffers provided within a single input/output unit.

For instance, a provision of the first embodiment described above to take the multimedia data from one buffer of one input/output unit to another buffer of another input/output unit may also be applied to a plurality of buffers provided within a single input/output unit so that the multimedia data can be taken from one buffer to another buffer within the same input/output unit.

Similarly, a provision of the third embodiment described above to predict a future necessary multimedia data of each input/output unit and pre-fetch the predicted future necessary multimedia data to each input/output unit may also be applied to each buffer of each input/output unit so that the future necessary multimedia data of each buffer can be pre-fetched to each buffer.

Also, a provision of the fifth embodiment described above to re-constructing a single unified request from a number of requests for the same multimedia data from different terminals connected with different input/output units may also be applied to a number of requests for the same multimedia data from different terminals connected with different buffers in a single input/output unit.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A multimedia server apparatus, comprising:
    at least one multimedia data storage device for storing multimedia data;
    at least one input/output unit having a plurality of buffers, each input/output unit being connected with at least one corresponding terminal and having at least one buffer for temporarily storing the multimedia data to be transferred to the corresponding terminal; and
    a data management unit for managing data transfer among the multimedia data storage device and buffers of said at least one input/output unit, by judging whether a desired multimedia data requested by one terminal connected with one buffer of said at least one input/output unit is present in another buffer of said at least one input/output unit other than said one buffer since the desired multimedia data has been requested by another terminal connected with said another buffer, and by controlling the multimedia data storage device and said at least one input/output unit to transfer the desired multimedia data to said one buffer from the multimedia data storage device when the desired multimedia data is judged as not present, or from said another buffer when the desired multimedia data is judged as present.

2. The apparatus of claim 1, wherein the data management unit switches a source for obtaining the multimedia data at said one buffer from said another buffer to a still another buffer of said at least one input/output unit or the multimedia data storage device, when said one terminal requests another desired multimedia data not present in said another buffer while the desired multimedia data is transferred from said another buffer to said one buffer.

3. The apparatus of claim 1, wherein one input/output unit having said one buffer includes a plurality of buffers for temporarily storing the multimedia data to be transferred to said one terminal, and a buffer selection unit for selecting a currently vacant one of said plurality of buffers for temporarily storing the desired multimedia data transferred from said another buffer or the multimedia data storage device.

4. The apparatus of claim 1, wherein the data management unit has a data management table registering a stored position of each multimedia data in the multimedia data storage device, and a buffer of said at least one input/output unit which stores each multimedia data.

5. The apparatus of claim 1, wherein said at least one input/output unit and the data management unit are formed by parallel processors.

6. A multimedia server apparatus, comprising:
    at least one multimedia data storage device for storing multimedia data;
    at least one input/output unit having a plurality of buffers, each input/output unit being connected with at least one corresponding terminal and having at least one buffer for temporarily storing the multimedia data to be transferred to the corresponding terminal;
    network means for connecting the multimedia data storage device and said at least one input/output unit, through which the multimedia data are transferred;
    prediction means for predicting future necessary multimedia data which will be necessary in future at each buffer of said at least one input/output unit; and
    pre-fetch means for monitoring the multimedia data transferred through the network means, and pre-fetching the future necessary multimedia data predicted by the prediction means from the multimedia data transferred through the network means into each buffer of said at least one input/output unit.

7. The apparatus of claim 6, wherein the prediction means and the pre-fetch means are provided within each input/output unit.

8. The apparatus of claim 6, wherein the prediction means and the pre-fetch means are provided in correspondence to each input/output unit.

9. The apparatus of claim 6, wherein said at least one input/output unit, the prediction means, and the pre-fetch means are formed by parallel processors.

10. A multimedia server apparatus, comprising:
    at least one multimedia data storage device for storing multimedia data;
    at least one input/output unit having a plurality of buffers, each input/output unit being connected with at least one corresponding terminal and having at least one buffer for temporarily storing the multimedia data to be transferred to the corresponding terminal; and a data management unit for managing data access to the multimedia data storage device and data transfer to buffers of said at least one input/output unit, by combining a plurality of requests for an identical multimedia data issued by different terminals connected with different buffers of said at least one input/output unit within a prescribed period of time into a single unified request, making a single access to the identical multimedia data in the multimedia data storage device according to the single unified request, and transferring the identical multimedia data obtained by the single access to said different buffers of said at least one input/output unit simultaneously.

11. The apparatus of claim 10, wherein said at least one input/output unit and the data management unit are formed by parallel processors.

12. A multimedia server apparatus, comprising:

at least one multimedia data storage device for storing multimedia data;

at least one input/output unit having a plurality of buffers, each input/output unit being connected with at least one corresponding terminal and having at least one buffer for temporarily storing the multimedia data to be transferred to the corresponding terminal; and a data management unit for managing data transfer among the multimedia data storage device and buffers of said at least one input/output unit, by selecting one of the multimedia data storage device and buffers of said at least one input/output unit which stores a desired multimedia data requested by one terminal connected with one buffer of said at least one input/output unit and which enables fastest access to the desired multimedia data, and controlling said one of the multimedia data storage device and buffers of said at least one input/output unit to transfer the desired multimedia data to said one buffer of said at least one input/output unit.

13. The apparatus of claim 12, wherein said at least one input/output unit and the data management unit are formed by parallel processors.

14. A data access method in a multimedia server having at least one multimedia data storage device for storing multimedia data and at least one input/output unit having a plurality of buffers, each input/output unit being connected with at least one corresponding terminal and having at least one buffer for temporarily storing the multimedia data to be transferred to the corresponding terminal, the method comprising the steps of:

judging whether a desired multimedia data requested by one terminal connected with one buffer of said at least one input/output unit is present in another buffer of said at least one input/output unit other than said one buffer since the desired multimedia data has been requested by another terminal connected with said another buffer; and controlling the multimedia data storage device and said at least one input/output unit to transfer the desired multimedia data to said one buffer from the multimedia data storage device when the desired multimedia is judged as not present, or from said another buffer when the desired multimedia data is judged as present.

15. The method of claim 14, further comprising the step of:

switching a source for obtaining the multimedia data at said one buffer from said another buffer to a still another buffer of said at least one input/output unit or the multimedia data storage device, when said one terminal requests another desired multimedia data not present in said another buffer while the desired multimedia data is transferred from said another buffer to said one buffer.

16. The method of claim 14, wherein one input/output unit having said one buffer includes a plurality of buffers for temporarily storing the multimedia data to be transferred to said one terminal, and the method further comprises the step of:

selecting a currently vacant one of said plurality of buffers for temporarily storing the desired multimedia data transferred from said another buffer or the multimedia data storage device at said one input/output unit.

17. The method of claim 14, further comprising the step of:

registering a stored position of each multimedia data in the multimedia data storage device and a buffer of said at least one input/output unit which stores each multimedia data in a data management table, so that the judging step judges according to the data management table.

18. A data access method in a multimedia server having at least one multimedia data storage device for storing multimedia data, at least one input/output unit having a plurality of buffers, each input/output unit being connected with at least one corresponding terminal and having at least one buffer for temporarily storing the multimedia data to be transferred to the corresponding terminal, and network means for connecting the multimedia data storage device and said at least one input/output unit, through which the multimedia data are transferred, the method comprising the steps of:

predicting future necessary multimedia data which will be necessary in future at each buffer of said at least one input/output unit; and monitoring the multimedia data transferred through the network means, and pre-fetching the future necessary multimedia data predicted at the predicting step from the multimedia data transferred through the network means into each buffer of said at least one input/output unit.

19. A data access method in a multimedia server having at least one multimedia data storage device for storing multimedia data, and at least one input/output unit having a plurality of buffers, each input/output unit being connected with at least one corresponding terminal and having at least one buffer for temporarily storing the multimedia data to be transferred to the corresponding terminal, the method comprising the steps of:

combining a plurality of requests for an identical multimedia data issued by different terminals connected with different buffers of said at least one input/output unit within a prescribed period of time into a single unified request;

making a single access to the identical multimedia data in the multimedia data storage device according to the single unified request; and transferring the identical multimedia data obtained by the single access to buffers of said different buffers of said at least one input/output unit simultaneously.

20. A data access method in a multimedia server having at least one multimedia data storage device for storing multimedia data, and at least one input/output unit having a plurality of buffers, each input/output unit being connected with at least one corresponding terminal and having at least one buffer for temporarily storing the multimedia data to be transferred to the corresponding terminal, the method comprising the steps of:

selecting one of the multimedia data storage device and buffers of said at least one input/output unit which stores a desired multimedia data requested by one terminal connected with one buffer of said at least one input/output unit and which enables fastest access to the desired multimedia data; and controlling said one of the multimedia data storage device and buffers of said at least one input/output unit to transfer the desired multimedia data to said one buffer of said at least one input/output unit.

* * * * *